US012542282B2

(12) United States Patent
Barde et al.

(10) Patent No.: US 12,542,282 B2
(45) Date of Patent: Feb. 3, 2026

(54) COATED THREE-DIMENSIONAL ELECTRONICALLY CONDUCTIVE NETWORK

(71) Applicant: IMEC VZW, Leuven (BE)

(72) Inventors: Fanny Barde, Holsbeek (BE); Philippe Vereecken, Hoegaarden (BE)

(73) Assignee: Imec VZW, Leuven (BE)

(*) Notice: Subject to any disclaimer, the term of this patent is extended or adjusted under 35 U.S.C. 154(b) by 469 days.

(21) Appl. No.: 18/252,515

(22) PCT Filed: Dec. 21, 2021

(86) PCT No.: PCT/EP2021/086974
§ 371 (c)(1),
(2) Date: May 10, 2023

(87) PCT Pub. No.: WO2022/136364
PCT Pub. Date: Jun. 30, 2022

(65) Prior Publication Data
US 2024/0021837 A1    Jan. 18, 2024

(30) Foreign Application Priority Data
Dec. 23, 2020   (EP) .................................... 20217174

(51) Int. Cl.
*H01M 4/62* (2006.01)
*H01M 4/04* (2006.01)
*H01M 10/0525* (2010.01)

(52) U.S. Cl.
CPC ......... *H01M 4/626* (2013.01); *H01M 4/0407* (2013.01); *H01M 10/0525* (2013.01)

(58) Field of Classification Search
CPC . H01M 4/626; H01M 4/0407; H01M 10/0525
See application file for complete search history.

(56) References Cited

U.S. PATENT DOCUMENTS

2017/0133662 A1    5/2017   Cui et al.

FOREIGN PATENT DOCUMENTS

CN   103682368 A   3/2014
EP      2980014 A1   2/2016
(Continued)

OTHER PUBLICATIONS

Timmermans, Marina Y., Felix Mattelaer, Sébastien Moitzheim, Nick Clerckx, Alfonso Sepulveda, Stella Deheryan, Christophe Detavernier, and Philippe M. Vereecken. "Electrodeposition of insulating poly (phenylene oxide) films with variable thickness." Journal of Applied Polymer Science 134, No. 10 (2017).

(Continued)

*Primary Examiner* — Sarah A. Slifka
(74) *Attorney, Agent, or Firm* — McDonnell Boehnen Hulbert & Berghoff LLP

(57) ABSTRACT

A coated three-dimensional electronically conductive network for acting as an electrode in a metal or metal-ion battery is provided, wherein the metal may include one or more of Na, K, Li, Ca, Mg, and Al. The network can be a three-dimensional electronically conductive network that includes a plurality of interconnected electronically conductive wires. Such a network can have a porosity of at least 60% and a volumetric surface area of from $10^{-3}$ m²/cm³ to 100 m²/cm³. The network can additionally include an electronically insulating coating that conformally covers all surfaces of the network and that is permeable and/or conductive to ions of the metal at at least one temperature in the range of from −30° C. to 150° C.

20 Claims, 9 Drawing Sheets

(56) References Cited

FOREIGN PATENT DOCUMENTS

| EP | 3043406 | A1 | 7/2016 |
|---|---|---|---|
| JP | 2019096475 | A | 6/2019 |
| KR | 20140018052 | A | 2/2014 |
| WO | 2019016033 | A1 | 1/2019 |
| WO | 2022136364 | A1 | 6/2022 |

OTHER PUBLICATIONS

Deheryan, Stella, D. J. Cott, Robert Muller, Marina Timmermans, Marc Heyns, and P. M. Vereecken. "Self-limiting electropolymerization of ultrathin, pinhole-free poly (phenylene oxide) films on carbon nanosheets." Carbon 88 (2015):42-50.

Chen, Xubin, Brecht Put, Akihiko Sagara, Knut Gandrud, Mitsuhiro Murata, Julian A. Steele, Hiroki Yabe et al. "Silica gel solid nanocomposite electrolytes with interfacial conductivity promotion exceeding the bulk Li—ion conductivity of the Ionic liquid electrolyte filler." Science Advances 6, No. 2 (2020): eaav3400.

Extended European Search Report and Search Opinion, Application No. EP 20217174.0, mailed May 20, 2021, 8 pages.

Liang, Zheng, Dingchang Lin, Jie Zhao, Zhenda Lu, Yayuan Liu, Chong Liu, Yingying Lu et al. "Composite lithium metal anode by melt infusion of lithium into a 3D conducting scaffold with lithiophilic coating." Proceedings of the National Academy of Sciences 113, No. 11 (2016): 2862-2867.

PCT International Search Report and Written Opinion, Application No. PCT/EP2021/086974, mailed Apr. 8, 2022, 11 pages.

Put, Brecht, M. J. Mees, Norah Hornsveld, Simon Hollevoet, A. Sepúlveda, P. M. Vereecken, W. M. M. Kessels, and M. Creatore. "Plasma-assisted ALD of LiPO (N) for solid state batteries." Journal of the Electrochemical Society 166, No. 6 (2019): A1239.

COATED THREE-DIMENSIONAL ELECTRONICALLY CONDUCTIVE NETWORK

CROSS-REFERENCE TO RELATED APPLICATIONS

The present application is a national stage entry of PCT/EP2021/086974 filed Dec. 21, 2021, which claims priority to EP 20217174.0 filed on Dec. 23, 2020, the contents of each of which are hereby incorporated by reference.

TECHNICAL FIELD

The present disclosure relates to the field of batteries, and more specifically, to a coated three-dimensional electronically conductive network, a method for forming the same, and a battery comprising the coated three-dimensional electronically conductive network acting as an anode.

BACKGROUND OF THE INVENTION

Negative electrodes (i.e. anodes) of lithium-ion batteries often comprise a material in which lithium may intercalate. However, anodes comprising a lithium foil instead may provide a much larger energy density. A battery comprising an anode comprising a lithium foil may therefore reach a much larger charge capacity. In the case of anodes comprised in batteries comprising a lithium foil, lithium is plated on the lithium foil or on the negative electrode during charging of the battery, and stripped from the lithium foil or the negative electrode during discharging of the battery.

Lithium foils pose several issues. Firstly, lithium dendrites may grow on the lithium foil or on the negative electrode due to the large current density caused by the planar geometry of the lithium foil. Lithium dendrites are rigid branched structures comprising lithium which may grow to penetrate the separator of the battery, and cause a short circuit of the battery. Secondly, a solid electrolyte interphase (SEI) may be formed on the surface of the lithium foil due to the irreversible reaction of metallic lithium with components of the electrolyte, or decomposition products of the electrolyte, thereby consuming lithium from the electrolyte. Furthermore, this can act as a blocking interface against lithium diffusion to the anode. Therefore, the SEI reduces the rate of charging and discharging of the lithium battery. Thirdly, the cycling performances of lithium batteries comprising lithium foil are generally low. The change in volume of the lithium foil on plating (during charging) and stripping (during discharging) of lithium metal on the lithium foil is detrimental to the lifetime of the anode. In particular, during stripping, voids may be formed, leading to mechanical stress, and possibly cracking of the foil. Also, when a solid electrolyte is used as the electrolyte of the battery, the volume change may result in a loss of contact between the lithium foil and the solid electrolyte. Fourthly, there are safety issues concerning Li metal cells containing both Li in its metallic form and a liquid electrolyte containing a flammable solvent. Safety issues also exist for the handling and manufacturing of lithium foils and the assembly of a battery cell using a lithium anode, due to the high reactivity of lithium metal with air, in particular with $H_2O$. Finally, the rate of charging and discharging of a lithium battery comprising a lithium foil may be low due to the small surface area of the lithium foil.

Electrodes comprising porous structures on which lithium may be plated and stripped have been used to overcome at least some of the issues mentioned above. For instance, Liang et al., PNAS 113 (2016) 2862-2867 discloses a porous structure comprising carbon fibers on which the lithium is plated. Using the porous structure may increase the surface area on which lithium may be plated, so that the rate of plating and stripping, and hence the rate of charging and discharging of the battery comprising the electrode, may be increased. At the same time, the increased surface area reduces the current density on the surface of the electrode, thereby reducing lithium dendrite formation, and, at the same time, increasing the achievable charge capacity. Finally, the volume change of the electrode comprising the porous structure on plating and stripping of lithium on the porous network is reduced, thus reducing mechanical stress within the electrode, and increasing the cycling performance.

Nevertheless, the cyclability of the porous structure comprising carbon fibers is still not very good, for instance, because the lithium plated on the carbon fibers is not protected against the electrolyte, so that an SEI may be formed. Also, as the carbon fibers form a random porous structure, the porosity and the volumetric surface area of the porous structure-comprising carbon fibers are not controlled, which are important parameters for the rate of charging of an electrode comprising the porous structure.

SUMMARY

The present disclosure provides a coated three-dimensional electronically conductive network, and methods for making the coated three-dimensional electronically conductive network. These embodiments can be obtained by methods and devices according to the present disclosure.

Embodiments described herein that include a coated three-dimensional electronically conductive network may, for example, be integrated in a battery to be used as an electrode, such as an anode.

In some embodiments of the present disclosure, the coating on all surfaces of the network is permeable and/or conductive to metal ions that are commonly used in electrolytes of batteries. In some embodiments of the present disclosure, the metal ions may permeate through the coating and, by applying a potential to the three-dimensional electronically conductive network, the metal ions may plate the three-dimensional electronically conductive network, forming plated metal on the three-dimensional electronically conductive network, between the three-dimensional electronically conductive network and the coating. In some embodiments of the present disclosure, this plating may be reversible, so that plated metal may, on the application of a second potential to the three-dimensional electronically conductive network, be stripped therefrom, after which the formed metal ions may permeate back through the coating.

It may be beneficial in some embodiments of the present disclosure that the plated metal would be covered by the coating and thereby protected from the environment, so that e.g. the formation of a solid electrolyte interphase (SEI) may be prevented. It may be beneficial in some embodiments of the present disclosure that the formation of lithium dendrites on the surface of the coated three-dimensional electronically conductive network may be suppressed.

It may be beneficial in some embodiments of the present disclosure that, as the coating uniformly covers over all surfaces of the coated three-dimensional electronically conductive network, plating of metal between the coating and the three-dimensional electronically conductive network may be uniform over all surfaces of the coated three-dimensional electronically conductive network. A uniform plating of metal may minimize mechanical stress within the coating induced by the plated metal. It may be beneficial in some embodiments of the present disclosure that the coating is non-conductive, so that metal may not be plated on the surface of the coating facing the electrolyte, in which case plated metal would be exposed to the environment.

It may be beneficial in some embodiments of the present disclosure that the porosity of the three-dimensional electronically conductive network is high, so that the coated three-dimensional electronically conductive network may be impregnated by an electrolyte comprising the metal ions. It may be beneficial in some embodiments of the present disclosure that the volumetric surface area of the three-dimensional electronically conductive network is large, so that the contact area between an electrolyte, for instance comprising the metal ions, and the coated three-dimensional electronically conductive network it impregnates, is large. Furthermore, in some embodiments, because of the large volumetric surface area, when a current is applied to the electronically conductive area, the current density on the surface of the three-dimensional electronically conductive network is low.

According to a first aspect, the present disclosure relates to a coated three-dimensional electronically conductive network for acting as an electrode in a metal or metal-ion battery wherein the metal is selected from the list consisting of $Na^+$, $K^+$, $Li^+$, $Ca^{2+}$, $Mg^{2+}$, and $Al^{3+}$, comprising: (i) a three-dimensional electronically conductive network comprising a plurality of interconnected electronically conductive wires, wherein the three-dimensional electronically conductive network has a porosity of at least 60% and a volumetric surface area of from $10^{-3}$ $m^2/cm^3$ to 100 $m^2/cm^3$, and (ii) an electronically insulating coating conformally covering all surfaces of the network and being permeable and/or conductive to ions of the metal at at least one temperature in the range of from −30° C. to 150° C.

According to a second aspect, the present disclosure relates to a method for forming a coated three-dimensional electronically conductive network for acting as an electrode in a metal or metal-ion battery, according to the first aspect of the present disclosure, comprising: (i) obtaining a three-dimensional electronically conductive network comprising a plurality of interconnected electronically conductive wires, wherein the three-dimensional electronically conductive network has a porosity of at least 60% and a volumetric surface area of from $10^{-3}$ $m^2/cm^3$ to 100 $m^2/cm^3$, and (ii) coating all surfaces of the three-dimensional electronically conductive network (i.e. all surfaces of the wires) conformally with an electronically insulating coating, wherein the coating is permeable and/or conductive to ions of the metal at at least one temperature in the range of from −30° C. to 150° C.

According to a third aspect, the present disclosure relates to a coated and plated three-dimensional electronically conductive network according to the first aspect of the present disclosure, comprising a conformal layer of the metal between the electronically insulating coating and the three-dimensional electronically conductive network.

According to a fourth aspect, the present disclosure relates to a coated and plated three-dimensional electronically conductive network for acting as an electrode in a metal or metal-ion battery, comprising: (i) a three-dimensional electronically conductive network; (ii) an electronically insulating coating over the three-dimensional electronically conductive network; and (iii) a conformal and uniform layer of the metal plated between the three-dimensional electronically conductive network and the electronically insulating coating.

According to a fifth aspect, the present disclosure relates to a method for plating a metal between a three-dimensional electronically conductive network and a coating of a coated three-dimensional electronically conductive network according to the first aspect of the present disclosure, the method comprising: (i) obtaining the coated three-dimensional electronically conductive network impregnated with an electrolyte comprising an ion of the metal, and (ii) applying a first potential for plating the metal to the three-dimensional electronically conductive network.

According to a sixth aspect, the present disclosure relates to a metal or metal-ion battery comprising a conductive substrate, a cathode on top of the conductive substrate, an electrolyte layer on top of the cathode, a coated three-dimensional electronically conductive network according to the first aspect of the present disclosure, wherein the coated three-dimensional electronically conductive network is impregnated with an electrolyte, or a coated and plated three-dimensional electronically conductive network according to the third or fourth aspect of the present disclosure, wherein the coated and plated three-dimensional electronically conductive network is impregnated with an electrolyte, acting as an anode on top of the electrolyte layer.

Particular aspects of the present disclosure are set out in the accompanying independent and dependent claims. Features from the dependent claims may be combined with features of the independent claims and with features of other dependent claims as appropriate and not merely as explicitly set out in the claims.

The above and other characteristics, features and benefits of the present disclosure will become apparent from the following detailed description, taken in conjunction with the accompanying drawings, which illustrate, by way of example, the principles of the present disclosure. This description is given for the sake of example only, without limiting the scope of the disclosure. The reference figures quoted below refer to the attached drawings.

Figure 1A:
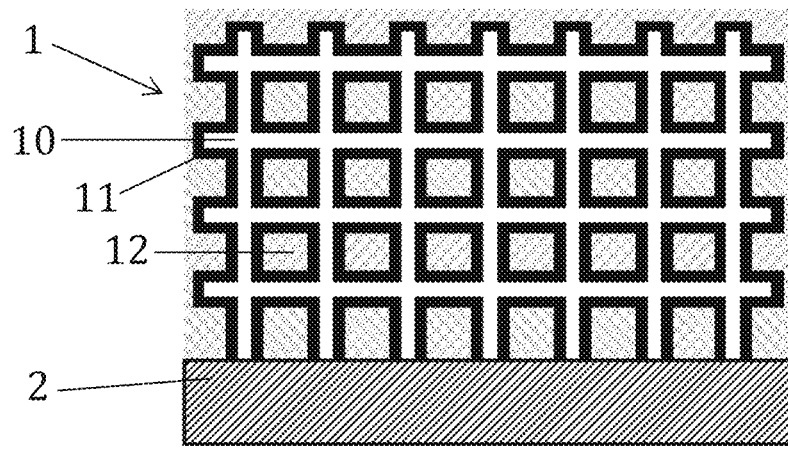
FIG. 1A schematically depicts a coated three-dimensional electronically conductive network, according to example embodiments.

In the different figures, the same reference signs refer to the same or analogous elements.

DESCRIPTION OF ILLUSTRATIVE EMBODIMENTS

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the present disclosure.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present (and can therefore always be replaced by "consisting of" in order to restrict the scope to the stated features) and the situation where these features and one or more other features are present. The word "comprising" according to the present disclosure therefore also includes as one embodiment that no further components are present. Thus, the scope of the expression "a device comprising means A and B" should not be interpreted as being limited to devices consisting only of components A and B. It means that with respect to the present disclosure, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the present disclosure, various features are sometimes grouped together in a single embodiment, figure, or description thereof for the purpose of streamlining the disclosure and aiding in the understanding of one or more of the various aspects thereof. This method of disclosure, however, is not to be interpreted as reflecting an intention that the claimed invention requires more features than are expressly recited in each claim. Rather, as the following claims reflect, inventive aspects may lie in less than all features of a single embodiment disclosed herein. Thus, the claims following the detailed description are hereby expressly incorporated into this detailed description, with each claim standing on its own as a separate embodiment of the present disclosure.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, an element described herein of an apparatus embodiment is an example of a means for carrying out the function performed by the element for the purpose of carrying out the embodiments of the present disclosure.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Where in the context of this description reference is made of "cathode" or "anode", reference is made to the electrochemical function of the corresponding materials during discharging of a battery comprising the cathode or anode. That is, during charging of the battery, the "cathode" functions as an anode, whereas the "anode" functions as a cathode. Similarly, where in the context of this description reference is made to "anode", reference is made to a negative electrode. Likewise, wherein in the context of this description, reference is made to "cathode", reference is made to a positive electrode.

According to a first aspect, the present disclosure relates to a coated three-dimensional electronically conductive network for acting as an electrode in a metal or metal-ion battery wherein the metal is selected from the list consisting of Na, K, Li, Ca, Mg, and Al, comprising: (i) a three-dimensional electronically conductive network comprising a plurality of interconnected electronically conductive wires, wherein the three-dimensional electronically conductive network has a porosity of at least 60% and a volumetric surface area of from $10^{-3}$ $m^2/cm^3$ to 100 $m^2/cm^3$, for example from 2 $m^2/cm^3$ to 90 $m^2/cm^3$, of for example from 10 $m^2/cm^3$ to 50 $m^2/cm^3$, and (ii) an electronically insulating coating conformally covering all surfaces of the network and being permeable and/or conductive to ions of the metal at at least one temperature in the range of from −30° C. to 150° C., such as at 20° C.

In some embodiments, the battery may be selected from a metal battery such as a metal-air (e.g. a Li—$O_2$ battery) or a metal sulphur battery (e.g. a Li—S battery), and a metal-ion battery such as a Li-ion battery. However, the present disclosure is not limited thereto. In some embodiments, the electronically conductive wires are electronically connected to each other. In some embodiments, the wires may comprise a conductive material. The conductive material may comprise, for instance, carbon or a metal, wherein the metal may for instance comprise copper, aluminium, nickel, zinc, or sodium. In some embodiments, the conductive material comprises copper. Copper provides various benefits, as it is a highly conductive material, and copper does not intercalate lithium, i.e. it does not alloy with lithium. Lithium batteries instead comprising electrodes comprising conductive materials capable of alloying with lithium, may show significant capacity losses over time. Without being bound by theory, such capacity losses may be due to effects resulting from the volume expansion of the conductive material, irreversible electrochemical reactions of the electrolyte, or diffusion-controlled trapping of lithium in the conductive material. In some embodiments, the material of the three-dimensional electronically conductive network is corrosion resistant.

In some embodiments, the three-dimensional electronically conductive network comprises pores, wherein the pores comprise, in some embodiments, the volume of the three-dimensional electronically conductive network not comprising the wires, that is, all space between the wires. In some embodiments, the pores form an interconnected network. In some embodiments, the porosity of the three-dimensional electronically conductive network is the percentage of the volume of the three-dimensional electronically conductive network that comprises pores, i.e. that does not comprise the wires. In some embodiments, a higher porosity may result in a larger amount of electrolyte that may impregnate the network, and in a larger diffusivity of the electrolyte and metal ions in the electrolyte through the network. In some embodiments, the porosity of the three-dimensional electronically conductive network is at least 60%, for example from 65% to 99%, for example from 70% to 98%, for example from 75% to 95%.

In some embodiments, these pores may have a mean width of from 10 to 500 nm, such as from 30 to 120 nm, for example from 45 to 100 nm, for example from 50 to 75 nm, for example from 55 to 65 nm.

In some embodiments, the coating on the surfaces of the three-dimensional electronically conductive network does not completely fill the pores of the three-dimensional electronically conductive network, so that the coated three-dimensional electronically conductive network also has pores. In some embodiments, these pores may have a mean width of from 26 to 116 nm, for example from 41 to 96 nm, for example from 46 to 71 nm, for example from 51 to 61 nm.

The pores of the coated three-dimensional electronically conductive network may be interconnected. In some embodiments the coated three-dimensional electronically conductive network may be impregnated by an electrolyte, thereby filling the pores of the coated three-dimensional electronically conductive network.

In some embodiments, the volumetric surface area is the ratio of surface area to volume of the three-dimensional electronically conductive network, wherein the surface area comprises the area of all surfaces of the wires of the three-dimensional electronically conductive network, and wherein the volume comprises the volume of the three-dimensional electronically conductive network, that is, including the volume of the pores of the three-dimensional electronically conductive network. Because of the large volumetric surface area, the three-dimensional electronically conductive network may have a very large surface area compared to e.g. a metal foil. For example, the surface area of the three-dimensional electronically conductive network with a thickness in the order of ten micrometer and certain lateral dimensions may be several orders of magnitude larger than the surface area of a metal foil with the same certain lateral dimensions. In some embodiments, if a current or potential is applied to the three-dimensional electronically conductive network, a larger volumetric surface area may correspond to a lower current density on the surface of the three-dimensional electronically conductive network. Furthermore, in some embodiments, a larger surface area may result in a larger overall rate of plating and stripping of metal on the surface of the three-dimensional electronically conductive network, between the coating and the three-dimensional electronically conductive network. In some embodiments, the wires may be nanowires. In some embodiments, the nanowires may have a mean thickness of from 20 nm to 500 nm, for example from 25 nm to 300 nm, for example from 30 nm to 200 nm.

In some embodiments, the three-dimensional electronically conductive network is an ordered network, that is, wherein the interconnected electronically conductive wires are not randomly oriented with respect to each other. In some embodiments, the width of pores of the three-dimensional electronically conductive network is uniform. For instance, 95% of the pores may have a width within 10% of each other. It can be beneficial to have a narrow pore size distribution because it allows optimizing the performances for a given volume. It allows to have pores with similar size and coating thicknesses, and hence a similar amount of electrolyte. It also facilitates a uniform metal (e.g. Li) deposition. Therefore, in some embodiments, for a network with a certain porosity and certain volumetric surface area, a uniform magnitude of pores may result in the largest diffusion rate that may be achieved.

In some embodiments, the interconnected electronically conductive wires comprise: spaced, electronically conductive first wires, wherein each nanowire is at an angle of at most 20°, such as at most 10°, for example at most 1°, for example 0°, with respect to a first direction; and electronically conductive nanoconnectors interconnecting neighbouring first wires and which are integral therewith. In some embodiments, the electronically conductive nanoconnectors are at an angle of at most 20°, such as at most 10°, for example at most 1°, for example 0°, with respect to a plane transversal to the first direction. In some embodiments, a first spacing between two adjacent first wires is from 20 nm to 200 nm. In some embodiments, a second spacing between two adjacent electronically conductive nanoconnectors is from 20 nm to 200 nm. In some embodiments, a diffusion rate of an electrolyte or ions through the coated three-dimensional electronically conductive network is limited by the smallest first or second spacing. Therefore, in some embodiments, for a network with a certain porosity and certain volumetric surface area, a uniform first and second spacing may result in the largest diffusion rate that may be achieved. In some embodiments, the three-dimensional electronically conductive network is monolithic. In some embodiments, the interconnected electronically conductive wires form a mesh such as described in EP2018/068671 and/or EP2980014A1, which are included here by reference.

In some embodiments, the coating of the coated three-dimensional electronically conductive network is permeable and/or conductive to at least one of the following metal ions: $Na^+$, $K^+$, $Li^+$, $Ca^{2+}$, $Mg^{2+}$, and $Al^{3+}$, for example to at least one of the following metal ions: $Na^+$, $Li^+$, $Mg^{2+}$, and $Al^{3+}$, for example to $Li^+$, at least one temperature in the range of from −30° C. to 150° C., such as at 20° C. In some embodiments, the metal is Li and the electronically insulating coating is permeable and/or conductive to $Li^+$ at at least one temperature in the range of from −30° C. to 150° C. $Li^+$ may be comprised in the electrolyte in batteries for providing ionic conduction, as batteries comprising $Li^+$ may have better performances, for instance with respect to cyclability, capacity per mass, compared to batteries comprising other metal ions. In some embodiments, the permeability of the coating allows the metal ions to diffuse through the coating. As a result, in some embodiments, by applying a potential to the three-dimensional electronically conductive network, the metal may be plated between the coating and the three-dimensional electronically conductive network.

In some embodiments, the coating is insulating i.e. non-conductive to electrons. In some embodiments, as a result, no electronic current may flow from the three-dimensional electronically conductive network to the coating. As a result, plating of any metal ions on the surface of the coating facing the pores does not occur. Metal plated on the surface of the coating facing the electrolyte would be in direct contact with the environment, such as with an electrolyte, so that reactions between the metal and the electrolyte may occur, which is highly unwanted.

The coating can conformally cover all surfaces of the network. That is, the coating may be continuous, i.e. pinhole-free, so that no part of the three-dimensional electronically conductive network, or any metal plated on the three-dimensional electronically conductive network, is in direct contact with an electrolyte impregnating the network. In some embodiments, furthermore, the conformality of the coating ensures that the diffusion time of the metal ion through the coating is uniform throughout the coated three-dimensional electronically conductive network. In some embodiments, if, for instance, metal ions comprised in an electrolyte impregnating the coated three-dimensional electronically conductive network diffuses through the uniform coating, on the application of a potential to the three-dimensional electronically conductive network, this may result in a uniform layer of plated metal, formed of the reduced metal ions, between the coating and the three-dimensional electronically conductive network. A layer of plated metal that is uniform may reduce the mechanical stress within the coating induced by the plated metal. In some embodiments, the electronically insulating coating has a thickness of from 2 to 500 nm, for example from 2 to 100 nm, for example from 2 to 50 nm, for example from 2 to 25 nm, for example from 2 to 5 nm. The thickness of the coating may be reduced so that speed of diffusion of metal ions through the coating is increased. The coating may be thick enough so that the coating is structurally strong enough to withstand cyclic plating and stripping of metal between the coating and the three-dimensional electronically conductive network.

In some embodiments, the electrochemical stability window of the coating covers at least a range of 0 to 4.5V, such as of 0 to 5.5V, relative to the reduction potential of the metal ion (e.g. $Li^+$). In these embodiments, a first potential may be applied to the three-dimensional electronically conductive network to reduce the metal ion (e.g. $Li^+$) to form and plate the metal (e.g. lithium) between the three-dimensional electronically conductive network and the coating, and subsequently, a second potential may be applied to oxidize the plated lithium to form $Li^+$, without the first or second potential inducing an electrochemical reaction involving the coating.

In some embodiments, an electrolyte comprising an ion of the metal impregnates the coated three-dimensional electronically conductive network, wherein a conductivity of the electronically insulating coating to the metal ion is larger than $0.1\ \sigma_{i,11}$, for example larger than $1\ \sigma_{i,11}$, even more preferably for example larger than $10\ \sigma_{i,11}$, and possibly not more than $1000\ \sigma_{i,11}$, such as not more than $100\ \sigma_{i,11}$, wherein $\sigma_{i,11}$ is given by the following formula:

$$\sigma_{i,11} = \frac{d_{11} \times (P/100\%)}{l_1^2 \times Av} \sigma_{12}$$

wherein $d_{11}$ is the thickness of the electronically insulating coating in μm, P is the porosity in % of the coated three-dimensional electronically conductive network, $1_1$ is the thickness in μm of the coated three-dimensional electronically conductive network, Av is the volumetric surface area in m$^2$/cm$^3$ of the coated three-dimensional electronically conductive network and $\sigma_{12}$ is the ionic conductivity of the electrolyte. In some embodiments, the electrolyte comprising a metal ion to which the coating is permeable and/or conductive impregnates the coated three-dimensional electronically conductive network, wherein the conductivity of the coating to the metal ion is lower than the thickness of the coating divided by the sheet resistance of the electrolyte over the thickness of the coated three-dimensional electronically conductive network, for example at least ten times lower. In some embodiments, the conductivity of the coating to the metal ion is non-zero. In some embodiments, the sheet resistance of the electrolyte over the thickness of the coated three-dimensional electronically conductive network may be calculated by dividing the thickness of the coated three-dimensional electronically conductive network by the conductivity of the electrolyte to the metal ion. In some embodiments, the ionic conductivity is high enough so that metal ion conduction through the coating is not negligible. In some embodiments, the conductivity of the coating to the metal ion is low enough so that the coated three-dimensional electronically conductive network is uniformly plated. In some embodiments, uniform plating may be achieved if the sheet conductivity, i.e. the inverse of the sheet resistance, of the electrolyte to the metal ion over the thickness of the coated three-dimensional electronically conductive network is higher than the sheet conductivity of the coating to the metal ion, for example at least ten times higher. In that way, the metal ion may permeate far enough into the coated three-dimensional electronically conductive network before it permeates the coating and, if a potential is applied, is plated between the coating and the three-dimensional electronically conductive network. In some embodiments, the farther the metal ion may permeate into the coated three-dimensional electronically conductive network before it permeates the coating, the more uniform the metal plating between the coating and the three-dimensional electronically conductive network may be.

In some embodiments, the coated three-dimensional electronically conductive network has a thickness of up to 50 μm, such as from 0.1 μm to 35 μm. Thicker networks may require coatings with a very slow metal ion conductivity to achieve uniform plating: a rate of plating of metal between the coating and the three-dimensional electronically conductive network may therefore become very small. In some embodiments, a trade-off may be sought between a large volume area of the coated three-dimensional electronically conductive network, and a high plating rate. Another problem with thicker coated three-dimensional electronically conductive network is that the homogeneity of the metal plating thickness may become bad. For instance, a difference of more than 20% between the metal plating thickness at the top of the coated three-dimensional electronically conductive network and the metal plating thickness at the bottom of the coated three-dimensional electronically conductive network could be observed, which is not optimum.

In some embodiments, the electrolyte impregnating the network may be any electrolyte, such as an electrolyte suitable for battery applications. In some embodiments, the electrolyte comprises one of the following metal ions: Na$^+$, Li$^+$, Mg$^{2+}$, and Al$^{3+}$, for example Li$^+$. In some embodiments, the electrolyte may be a liquid electrolyte, a gel-type electrolyte, a solid electrolyte, an ionic liquid electrolyte, or a composite electrolyte. The composite electrolyte may be such as described in EP3043406, and Chen et al., Science Advances 6 (2020) eaav3400. For instance, the composite electrolyte may be a material comprising an electronically insulating material, e.g. a continuous layer of electronically insulating material, having a plurality of pores; and a solid electrolyte material covering the inner surfaces of the plurality of pores. In some embodiments, composite electrolytes may be selected for their potential very high ion mobility, and for their high flexibility. In some embodiments, the electrolyte is not flammable, such as up to a temperature of 300° C., for instance up to a temperature of 250° C., such as for example up to a temperature of 150° C. Furthermore, the electrolyte may have a decomposition temperature of at least 300° C., for instance at least 250° C., such as for example at least 150° C.

In some embodiments, the coating comprises one of the following materials: a solid electrolyte, an oxide such as a porous oxide, a polymer, a hybrid-inorganic organic material, a metal-organic framework, or a covalent organic framework. In some embodiments, the electronically insulating coating may be unreactive towards the metal, for example Li, at least at from −30° C. to 180° C., such as at from −30° C. to 150° C. In some embodiments, the coating is unreactive towards the ions of the metal, for example Li$^+$, such as at least at from −30° C. to 180° C., such as from −30° C. to 150° C. In some embodiments wherein the metal is Li, the electronically insulating coating may be permeable and/or conductive to Li$^+$ at at least one temperature in the range of from −30° C. to 150° C., such as at 60° C. In some embodiments, the coating is stable towards electrolytes generally used in batteries. In some embodiments, the coating is flexible, so that plating and stripping of metal between the coating and the three-dimensional electronically conductive network do not cause mechanical stress in the coating.

In some embodiments, the solid electrolyte may comprise one of the following materials: Li$_3$PO$_4$, N-doped Li$_3$PO$_4$ (LiPON), Li-doped poly (phenylene oxide), Li-doped poly (ethylene oxide), and a Li salt selected from: LiTFSI, LiFSI or LiBOB or LiDFOB, LiSO$_3$CF$_3$, LiClO$_4$, LiBF$_4$, LiPF$_6$, LiAsF$_6$, Li$_2$O, doped-Li$_2$O, LiI, LiCl, LiBr, Li$_2$CO$_3$, and Li$_2$SO$_4$. In some embodiments, the oxide may comprise: La$_2$O$_3$, TiO$_2$, MgO, InZnO, and ZrO$_2$. In some embodiments, the hybrid-inorganic organic material may comprise a metal alkoxide, which may be the reaction product of a metal precursor with an organic alcohol, wherein the metal precursor may comprise lanthanum, aluminium, titanium, zinc, zirconium, indium, or tin.

In some embodiments, the porous oxide may comprise an oxide of silicon, aluminium, zirconium, titanium, or a combination thereof, or a phosphate. In some embodiments, the porous oxide may comprise pores with a mean diameter of 100 nanometers or smaller, for example with a mean diameter of from 2 to 50 nm. In some embodiments, the pores form an interconnected network.

In some embodiments, a benefit of the coated three-dimensional electronically conductive network is that metal e.g. lithium is not required to be comprised in the coated three-dimensional electronically conductive network before integration of the coated three-dimensional electronically conductive network e.g. in a battery such as a solid-state battery. In some embodiments, the absence of in particular lithium, which is very reactive towards for instance $CO_2$ and $H_2O$, facilitates the handling and storage of the coated three-dimensional electronically conductive network. In some embodiments, the absence of lithium facilitates the integration of the coated three-dimensional electronically conductive network in a battery cell. In some embodiments, the absence of lithium facilitates the transport of a battery comprising the coated three-dimensional electronically conductive network, compared to a battery e.g. comprising a lithium foil.

In some embodiments, the metal is comprised in the coated three-dimensional electronically conductive network e.g. as a conformal metal layer i.e. a conformal layer of the metal on the wires. Therefore, in some embodiments, the coated three-dimensional electronically conductive network comprises a conformal metal layer between the coating and the three-dimensional electronically conductive network, the metal layer comprising one of the following metals: aluminium, lithium, magnesium, and sodium, for example lithium. In some embodiments, the metal layer comprises the metal of one of the at least one of the metal ions, that is, to which the coating is permeable and/or conductive. In some embodiments wherein the coated three-dimensional electronically conductive network comprises the conformal metal layer, stripping the conformal metal layer by applying a potential may result in generating a current, which may for instance be used for powering an external device. In some embodiments, the conformality of the metal layer minimizes the mechanical stress within the coating induced by the metal layer.

In some embodiments, a difference of less than 20%, for example less than 15%, for example less than 10%, for example less than 5% between the conformal metal layer thickness at a top of the coated three-dimensional electronically conductive network and the conformal metal layer thickness at the bottom of the coated three-dimensional electronically conductive network is present, wherein the top and bottom are separated by the coated three-dimensional electronically conductive network thickness.

In some embodiments, the coated three-dimensional electronically conductive network comprises a seed layer between the coating and the three-dimensional electronically conductive network, the seed layer being such as to promote the growth of a layer of the metal, a compound of the metal, or an alloy of the metal, the seed layer conformally covering all surfaces of the network. In embodiments wherein the coated electronically conducting network comprises the conformal metal layer, the conformal metal layer is comprised between the coating and the seed layer. In some embodiments, the rate of plating of the metal on the seed layer is higher than the rate of plating of the metal on the three-dimensional electronically conductive network. In some embodiments, the seed layer is conductive to current. In some embodiments, the seed layer is in electrical contact with the three-dimensional electronically conductive network. In these embodiments, a potential may be applied to the seed layer via the three-dimensional electronically conductive network, for instance, to plate metal on the surface of the seed layer, between the coating and the seed layer.

The presence of the seed layer may be beneficial because, in its absence, islands of plated metal may sometimes form on the three-dimensional electronically conductive network, that is, parts of the three-dimensional electronically conductive network may initially be covered by plated metal, whereas other parts of the three-dimensional electronically conductive network would not be covered by plated metal. If present, the islands of plated metal may act as seeds islands, so that the rate of plating of metal on the islands of plated metal is faster than the rate of plating on the three-dimensional electronically conductive network. As a result, the plating of the metal between the coating and the three-dimensional electronically conductive network may not be uniform, so that mechanical stress within the coating is induced by the plated metal, which may result in breaking of the coating. In some embodiments, the seed layer may prevent the formation of islands of metal. The rate of plating of metal on the seed layer may be faster than the rate of plating of metal on the islands of metal. Therefore, in some embodiments, the seed layer may induce the formation of a conformal metal layer.

In some embodiments, the seed layer comprises one of the following materials: carbon, silicon, germanium, tin, and indium; an oxide or nitride of carbon, silicon, germanium, tin, and indium; a material capable of alloying with the metal compound, such as Au, Al, Sn, Si, Ge, ITO, AuSn, $Li_xSi$ wherein $0 \leq x \leq 4.4$, $Li_xSn$ wherein $2/5 \leq x \leq 22/5$ e.g. $Li_2Sn_5$, LiSn, $Li_7Sn_3$, $Li_5Sn_2$, $Li_{13}Sn_5$, $Li_7Sn_2$, or $Li_{22}Sn_5$, $Li_xIn_y$ wherein $0 \leq x \leq 1.5$ e.g. LiIn, $Li_5In_4$, or $Li_3In_2$, or $Li_xAuSn$ wherein $0 \leq x \leq 2.2$; and a composite of a polymer and carbon such as polytetrafluoroethylene (PTFE)/carbon, polyvinylidene fluoride (PvDF)/carbon and silver/carbon. In some embodiments, the seed layer has a thickness of from 2 to 100 nm, for example from 2 to 25 nm. In some embodiments, the sum of the thickness of the seed layer and the thickness of the coating may be less than 40%, such as less than 30%, for example less than 25%, of an interwire distance between adjacent wires.

Any features of any embodiment of the first aspect may be independently as correspondingly described for any embodiment of any of the other aspects of the present disclosure.

According to a second aspect, the present disclosure relates to a method for forming a coated three-dimensional electronically conductive network according to the first aspect of the present disclosure, comprising: (i) obtaining a three-dimensional electronically conductive network comprising a plurality of interconnected electronically conductive wires, wherein the three-dimensional electronically conductive network has a porosity of at least 60% and a volumetric surface area of from $10^{-3}$ $m^2/cm^3$ to 100 $m^2/cm^3$, such as from 2 $m^2/cm^3$ to 90 $m^2/cm^3$, and (ii) coating all surfaces of the three-dimensional electronically conductive network conformally with an electronically insulating coating, wherein the coating is permeable and/or conductive to ions of the metal at at least one temperature in the range of from $-30°$ C. to $150°$ C., such as at $20°$ C.

Any features of any embodiment of the second aspect may be independently as correspondingly described for any embodiment of any of the other aspects of the present disclosure.

In some embodiments, the coating of step (ii) may be performed using at least one of the following techniques: atomic layer deposition, molecular layer deposition, electrochemical deposition chemical solution deposition, sol-gel depositions, dip-coating, spray-coating, chemical vapor deposition, electro-polymerization, electro-precipitation, electrochemically assisted self-assembly, and electroless deposition. In some embodiments, these techniques may be highly suitable for forming a conformal coating. In particular, in some embodiments, atomic layer deposition and molecular layer deposition may comprise a surface-limited reaction, and therefore may yield a highly conformal coating. The conformal deposition of coatings using these techniques has previously been described in the literature, for instance in: B. Put et al., J. Electrochem. Soc. 166 (2019)

A1239-A1242; S. Deheryan et al., Carbon 88 (2015) 42-50; and M. Timmermans et al., J. of Appl. Polym. Sci. 134 (2016) 44533-44539.

In some embodiments, the three-dimensional electronically conductive network may be obtained via any method suitable for yielding the three-dimensional electronically conductive network. In some embodiments, the three-dimensional electronically conductive network may be formed, for instance by: anodization of a material such as alumina, thereby forming a template comprising pores; plating of the precursor for the material of the three-dimensional electronically conductive network inside the pores of the template; and removing the template material, i.e. via etching of the template material. In some embodiments, a method such as described in EP2018/068671 and/or EP2980014A1 may be used for forming the three-dimensional electronically conductive network.

In some embodiments, obtaining the three-dimensional electronically conductive network may comprise, as described in EP2018/068671, forming a porous solid material comprising a plurality of interconnected wires, the plurality of interconnected wires forming an ordered network comprising a plurality of first wires having a first longitudinal direction and a plurality of second wires having a second longitudinal direction different from the first longitudinal direction, wherein the plurality of first wires and the plurality of second wires are arranged according to a regular pattern with a predetermined mean interwire distance between adjacent wires, and wherein the plurality of first wires and the plurality of second wires have a predetermined mean wire diameter, wherein the method comprises:

fabricating a template comprising a plurality of interconnected channels;
afterwards depositing a solid material within the plurality of interconnected channels of the template; and
afterwards removing the template to thereby obtain the porous solid material,
wherein fabricating the template comprises:
performing a first anodization step of a doped valve metal layer at a predetermined anodization voltage, thereby anodizing at least part of the valve metal layer in a thickness direction and thereby forming a porous layer of valve metal oxide comprising a plurality of interconnected channels, the plurality of interconnected channels forming an ordered network comprising a plurality of first channels having the first longitudinal direction and a plurality of second channels having the second longitudinal direction, wherein the plurality of first channels and the plurality of second channels are arranged according to a regular pattern having the predetermined mean interwire distance between adjacent channels, and wherein the plurality of first channels and the plurality of second channels have a mean channel width, each channel having channel walls, the plurality of first channels having a channel bottom, the channel bottoms being coated with a first insulating metal oxide barrier layer as a result of the first anodization step;
performing a protective treatment of the porous layer of valve metal oxide, thereby inducing hydrophobic surfaces to the channel walls and channel bottoms;
performing a second anodization step at the predetermined anodization voltage after the protective treatment, thereby substantially removing the first insulating metal oxide barrier layer from the channel bottoms, inducing anodization only at the bottoms of the plurality of first channels and creating a second insulating metal oxide barrier layer at the channel bottoms; and
performing an etching step in an etching solution, thereby removing the second insulating metal oxide barrier layer from the channel bottoms without thereby substantially increasing the mean channel width.

In some embodiments, any term of the above embodiment may be independently as correspondingly described in the description of EP2018/068671.

In some embodiments, fabricating the template may, as described in EP2980014A1, comprise anodizing an assembly of two contiguous layers, the first layer being made of a material forming a network of interconnected channels upon anodization and the second layer being made of a material forming a cluster of aligned separated channels upon anodization, wherein the template is for forming a cluster of aligned wires, the template comprising an assembly of two contiguous layers, the first layer comprising a cluster of aligned separated channels and the second layer comprising a network of aligned interconnected channels. In some embodiments, any term of the above embodiment may be independently modified as correspondingly described in the description of EP2980014A1.

In embodiments wherein the coated three-dimensional electronically conductive network comprises a seed layer between the coating and the three-dimensional electronically conductive network, the method for forming the coated three-dimensional electronically conductive network may further comprise a step a' after step a and before step b of coating all surfaces of the three-dimensional electronically conductive network conformally with the seed layer. In some embodiments, on subsequent application of step b after step a', the coating conformally covers the seed layer. In some embodiments, the seed layer may be deposited using any of the techniques for depositing the coating.

In embodiments wherein the coated three-dimensional electronically conductive network is impregnated with an electrolyte, the method may further comprise a step c after step b of impregnating the coated three-dimensional electronically conductive network with the electrolyte. In some embodiments, the electrolyte comprises a metal ion, for example a metal ion to which the coating is permeable and/or conductive. In some embodiments wherein the electrolyte is a liquid electrolyte, the liquid electrolyte may be poured onto the coated three-dimensional electronically conductive network, wherein the liquid electrolyte subsequently flows through the pores of the coated three-dimensional electronically conductive network, thereby impregnating the coated three-dimensional electronically conductive network. In embodiments wherein the electrolyte is a solid electrolyte, for instance, a liquid precursor for the solid electrolyte, wherein the liquid precursor forms the solid electrolyte for instance on the application of a potential across the liquid precursor, may first impregnate the coated three-dimensional electronically conductive network, after which the solid electrolyte is formed from the liquid precursor, for instance via an electrochemical reaction e.g. on the application of a potential across the liquid precursor. In embodiments wherein the electrolyte is a solid electrolyte, the coated three-dimensional electronically conductive network may be pressed into the solid electrolyte or the solid electrolyte may be pressed into the coated three-dimensional electronically conductive network. In such embodiments, the solid electrolyte is soft or flexible. In some embodiments, the solid electrolyte may be a polymer electrolyte, so that thermoplastic molding of the polymer electrolyte may be used.

According to a third aspect, the present disclosure relates to a coated and plated three-dimensional electronically conductive network according to the first aspect of the present disclosure, comprising a conformal layer of the metal between the electronically insulating coating and the three-dimensional electronically conductive network.

Any features of any embodiment of the third aspect may be independently as correspondingly described for any embodiment of any of the other aspects of the present disclosure.

In some embodiments, the thickness of the conformal layer of the metal may be from 5 to 500 nm, for example from 10 to 100 nm. In some embodiments, the sum of the thickness of the conformal layer of the metal and the thickness of the coating, and in some embodiments the thickness of the seed layer may be less than 40%, such as less than 30%, for example less than 25%, of an interwire distance between adjacent wires.

According to a fourth aspect, the present disclosure relates to a coated and plated three-dimensional electronically conductive network for acting as an electrode in a metal or metal-ion battery, comprising: (i) a three-dimensional electronically conductive network; (ii) an electronically insulating coating over the three-dimensional electronically conductive network; and (iii) a conformal and uniform layer of the metal-plated between the three-dimensional electronically conductive network and the electronically insulating coating.

Any features of any embodiment of the fourth aspect may be independently as correspondingly described for any embodiment of any of the other aspects of the present disclosure.

In some embodiments, the coated and plated three-dimensional electronically conductive network may be considered as an active electrode.

In some embodiments, uniform comprises that the three-dimensional electronically conductive network has a thickness extending from a first to a second surface of the network and wherein the mean thickness of the metal layer on the first surface is within 50%, for example within 20% of the thickness of the metal layer on the second surface.

According to a fifth aspect, the present disclosure relates to a method for plating a metal between a three-dimensional electronically conductive network and a coating of a coated three-dimensional electronically conductive network according to the first aspect of the present disclosure, the method comprising: (i) obtaining the coated three-dimensional electronically conductive network impregnated with an electrolyte comprising an ion of the metal, and (ii) applying a first potential for plating the metal to the three-dimensional electronically conductive network.

The three-dimensional electronically conductive network may act as a first electrode and serve as an electrode.

The second electrode will be selected so that it can provide the metal ion to which the coating is permeable and/or ion conductive (e.g. $Li^+$) to the electrolyte.

In some embodiments, the three-dimensional electronically conductive network may be part of an electrochemical cell within a battery, and step (ii) may be performed after the formation of the electrochemical cell and of the battery by using the cathode of the electrochemical cell as a second electrode.

In some embodiments, the three-dimensional electronically conductive network may be plated before the formation of the battery and of the electrochemical cell.

Any features of any embodiment of the fifth aspect may be independently as correspondingly described for any embodiment of any of the other aspects of the present disclosure.

In some embodiments, step (i) of obtaining the coated three-dimensional electronically conductive network impregnated with an electrolyte may comprise a method of the second aspect, comprising step c of the second aspect comprising impregnating the coated three-dimensional electronically conductive network.

In some embodiments, an ion of the metal comprised in the electrolyte comprises a metal ion to which the coating is permeable and/or conductive. Therefore, in some embodiments, the ion of the metal may permeate the coating, and possibly electronically contact the three-dimensional electronically conductive network.

In some embodiments, the first potential is negative. In these embodiments, applying the first potential to the three-dimensional electronically conductive network may induce a reduction of the ion of the metal on the surface of the three-dimensional electronically conductive network, thereby plating the metal between the three-dimensional electronically conductive network and the coating. In embodiments wherein the coated three-dimensional electronically conductive network comprises a seed layer between the three-dimensional electronically conductive network and the coating, applying a potential to the three-dimensional electronically conductive network results in the application of a potential to the seeding layer. Therefore, in these embodiments, reduction of the ion may for instance occur on the surface of the seed layer, thereby possibly plating the metal between the seed layer and the coating. Alternatively, in embodiments wherein the seed layer may alloy with the metal, reduction of the ion may result in alloying of the seed layer with the metal. In some embodiments, the first potential is sufficient to reduce the ion. In some embodiments, the first potential is so that it does not damage the coating. In some embodiments, the first potential is so that it does not induce an electrochemical reaction between the coating and the electrolyte.

In some embodiments, the method comprises a further step (iii) of cyclically applying a second potential, thereby stripping the metal between the three-dimensional electronically conductive network and the coating, and the first potential, thereby plating the metal between the three-dimensional electronically conductive network and the coating. In some embodiments, the first potential and the second potential are applied to the three-dimensional electronically conductive network. In some embodiments, the second potential is sufficient to oxidize the metal, thereby forming the ion of the metal i.e. the metal ion. Subsequently, in some embodiments, the metal ion may permeate the coating and, subsequently, possibly move into the electrolyte. In some embodiments, the second potential is positive. In some embodiments, the second potential is sufficient so that it does not damage the coating. In some embodiments, the second potential is sufficient so that it does not induce an electrochemical reaction between the coating and the electrolyte.

In some embodiments, the electrolyte used for the plating of the three-dimensional electronically conductive network may be the same electrolyte impregnating the coated three-dimensional electronically conductive network in a metal or metal-ion battery. However, this is not necessary. In some embodiments, for example, the coated three-dimensional electronically conductive network may be impregnated first with a first electrolyte comprising ions of the metal for plating of the metal according to embodiments of the fifth aspect, after which the first electrolyte is removed, e.g. by a process comprising rinsing, and subsequently, the coated three-dimensional electronically conductive network may be impregnated by a second electrolyte.

According to a sixth aspect, the present disclosure relates to a metal or metal-ion battery comprising a conductive substrate, a cathode on top of the conductive substrate, an electrolyte layer on top of the cathode, a coated three-dimensional electronically conductive network according to the first aspect of the present disclosure, and wherein the coated three-dimensional electronically conductive network is impregnated with an electrolyte, or a coated and plated three-dimensional electronically conductive network according to the third or fourth aspect of the present disclosure, wherein the coated and plated three-dimensional electronically conductive network is impregnated with an electrolyte, acting as an anode on top of the electrolyte layer.

Any features of any embodiment of the sixth aspect may be independently as correspondingly described for any embodiment of any of the other aspects of the present disclosure.

In some embodiments, the battery further comprises a current collector on top of and in electrical contact with the coated three-dimensional electronically conductive network. In some embodiments, the current collector comprises a metal foil comprising a metal suitable for use as an anode in a solid-state battery, such as copper, nickel, or stainless steel.

In some embodiments, the cathode may be a composite cathode, i.e. a cathode formed of a plurality of materials. In some embodiments, in the context of the battery of the sixth aspect, "cathode" and "anode" refer to the electrochemical function of the corresponding materials during discharging of the battery. In some embodiments, during charging of the battery, the "cathode" functions as an anode, whereas the "anode" functions as a cathode.

In some embodiments, the cathode is in electrical contact with the conductive substrate. In some embodiments, the composite cathode may comprise electrode particles comprising electrode material, and wherein the electrode particles are in electrical contact with each other. In some embodiments, the electrode material may comprise at least one material selected from lithium manganese nickel oxide (LMNO), lithium manganese oxide (LMO), lithium iron phosphate (LFP), lithium manganese iron phosphate (LMFP), Lithium manganese phosphate (LMP), lithium cobalt oxide (LCO), lithium nickel manganese cobalt oxide (NMC), and lithium nickel cobalt aluminum oxide (NCA). In these embodiments, the electrode particles may be bonded together with a polymer binder i.e. to physically stabilize the porous active electrode material. Furthermore, in embodiments wherein the porous active electrode material comprises electrode particles, a conductive additive such as carbon black, graphite, carbon-based fibers and beads, or stainless steel fibers may be comprised in the pores and in electrical contact with the porous active electrode material, thereby improving the electrical contact between the electrode particles. For instance, the conductive additive comprised in the pores may be 0-10 wt %, for example 0.1 to 10 wt % of the weight of the porous active electrode material.

In some embodiments, the battery comprises an electrolyte, wherein the electrolyte impregnates the three-dimensional electronically conductive network, the (e.g. composite) cathode, and the electrolyte layer.

In some embodiments, the electrolyte layer is non-conducting to current. In such embodiments, the electrolyte layer may act as a separator between the anode and the cathode of the battery. In some embodiments, the electrolyte layer prevents short-circuit between the cathode and the anode. In some embodiments, the electrolyte layer has a thickness of at most 30 µm, for example at most 15 µm, so as to take up as little space as possible. In some embodiments, the electrolyte layer is permeable to a metal ion. In some embodiments, the electrolyte layer permits the metal ion to pass without impediment. In some embodiments, the electrolyte layer is porous. In these embodiments, the metal ion may diffuse between the anode and the cathode e.g. during charging and discharging of the battery. In some embodiments, the metal ion is the same metal ion as the metal ion to which a coating of the coated three-dimensional electronically conductive network is permeable and/or conductive. For instance, it may be lithium. In some embodiments, the electrolyte layer is resistant to penetration by burrs or dendrites, e.g. dendrites growing on the anode and/or cathode. In some embodiments, the electrolyte layer is resistant to contamination of the electrode coating to prevent the possibility of short circuits between the electrodes. In some embodiments, the electrolyte layer may be a mechanical spacer, fibreglass cloth or a flexible plastic film made from nylon, polyethylene, or polypropylene. In some embodiments, mechanical features such as penetrability by burrs or dendrite growth or permeability to the metal ion are maintained also at temperatures above room temperature, i.e. at the temperatures at which the battery typically operates. In some embodiments, the electrolyte layer comprises the same ion of the metal as the electrolyte impregnating the electronically conductive network. In some embodiments, the electrolyte layer comprises the same material as the electrolyte impregnating the electronically conductive network.

In some embodiments, the electrolyte is a solid electrolyte (e.g. a gel electrolyte), and the battery is a solid-state battery. Solid-state batteries that comprise a solid electrolyte are safer than batteries comprising a liquid electrolyte, as liquid electrolytes generally comprise flammable organic solvents. In some embodiments, the electrolyte is a gel electrolyte such as a polymeric gel electrolyte. For example, the electrolyte is a solid composite electrolyte (SCE), e.g., a solid nano-composite electrolyte (nano-SCE).

In some embodiments, charging the battery corresponds to applying a first potential to the anode, thereby plating a metal, such as lithium, between the coating and the three-dimensional electronically conductive network. In some embodiments, discharging the battery corresponds to applying a second potential to the anode, thereby stripping the metal. In some embodiments, stripping the metal generates a current that may be used to power an external device.

Hence, in some embodiments, cyclically charging and discharging the battery may comprise cyclically plating and stripping of the metal. In some embodiments, cyclically plating and stripping of the metal may comprise a method according to embodiments of the fifth aspect of the present disclosure. In some embodiments, the battery may be charged and discharged cyclically, i.e. the battery may be a rechargeable battery. It is a benefit of some embodiments of the present disclosure that the volume change on plating and stripping of metal between the coating and the coated three-dimensional electronically conductive network results in a negligible volume change of the coated three-dimensional electronically conductive network, so that the pressure exerted on the cell by the coated three-dimensional electronically conductive network is limited.

In some embodiments, the conductive substrate comprises a metal foil comprising a metal suitable for use as a cathode in a battery, such as aluminium, nickel, or stainless steel. In some embodiments, the conductive substrate may be corrosion-resistant, which may be a feature of the material of the conductive substrate. Possibly, the conductive substrate is coated with a protection layer, thereby rendering the conductive substrate corrosion-resistant.

In some embodiments, the metal or metal-ion battery according to embodiments of the sixth aspect may be used in a device such as: a computer; a phone; a vehicle such as a car, a scooter, a boat, or an airplane; a drone; a satellite; or a robot.

The present disclosure will now be described by a detailed description of several example embodiments. It is clear that other embodiments of the present disclosure can be configured according to the knowledge of persons skilled in the art without departing from the technical teaching of the present disclosure, the invention being limited only by the terms of the appended claims.

Example 1: Plating of Metal Between a Three-Dimensional Electronically Conductive Network and a Coating Covering the Three-Dimensional Electronically Conductive Network Reference is made to FIG. 1A. FIG. 1A schematically shows a coated three-dimensional electronically conductive network 1 according to embodiments of the first aspect of the present disclosure. The coated three-dimensional electronically conductive network 1 comprises a three-dimensional electronically conductive network 10 and a coating 11 conformally covering all surfaces of the three-dimensional electronically conductive network 10. Furthermore, in this example, an electrolyte 12 impregnates the coated three-dimensional electronically conductive network 1. In this example, the three-dimensional electronically conductive network 10 is electronically contacted with a current collector 2. However, in alternative embodiments, the coated three-dimensional electronically conductive network 1 may be free-standing and lack the current collector 2. The current collector 2 can be obtained during the formation of the three-dimensional electronically conductive network 1 by growing the current collector 2 on the electronically conductive substrate 1.

Figure 1B:
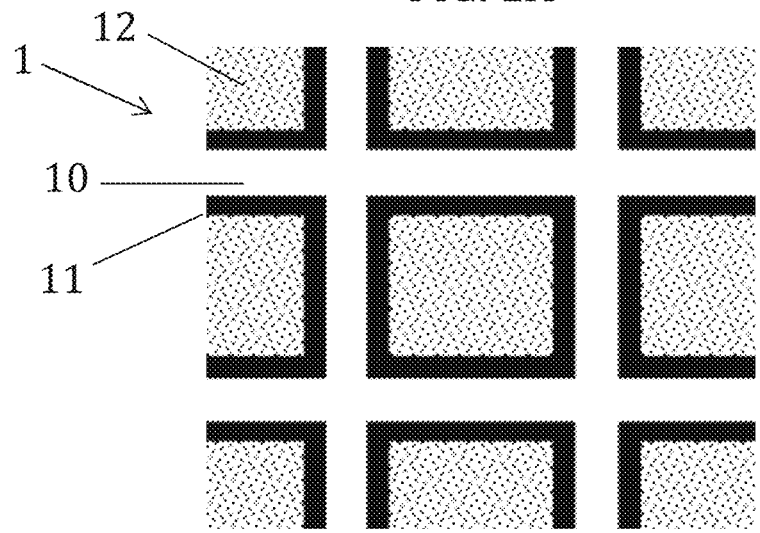
FIG. 1B schematically depicts a coated three-dimensional electronically conductive network, according to example embodiments.

Reference is made to FIG. 1B, which shows an enlargement of the part of FIG. 1A indicated by the dashed box, more closely showing the three-dimensional electronically conductive network 10, which is conformally covered by a coating 11, and wherein the electrolyte 12 impregnates the coated three-dimensional electronically conductive network 1. The electrolyte 12 may for instance be a liquid electrolyte or a solid electrolyte, comprising at least one of the following metal ions: $Na^+$, $Li^+$, $Mg^{2+}$, and $Al^{3+}$. The electrolyte 12 may be a gel (e.g. a nano-SCE). The coating 11 is permeable and/or conductive to the metal ion comprised in the electrolyte 12.

As an example of plating according to the fifth aspect of the present disclosure, the electrolyte 12 may be contacted with a second electrode (not shown) which may be an anode, and the three-dimensional electronically conductive network 10 may be a first electrode e.g. a cathode. A potential may be applied via the first and second electrodes across the electrolyte 12. In some embodiments, the metal ion permeating the coating 11 may become plated between the coating 11 and the three-dimensional electronically conductive network 10. The coating 11 is electronically insulating. In this example, the coating 11 is electrochemically resistant, so that the potential that is applied does not induce an electrochemical reaction of the coating 11 e.g. with the electrolyte 12 or with the metal being plated.

Figure 1C:
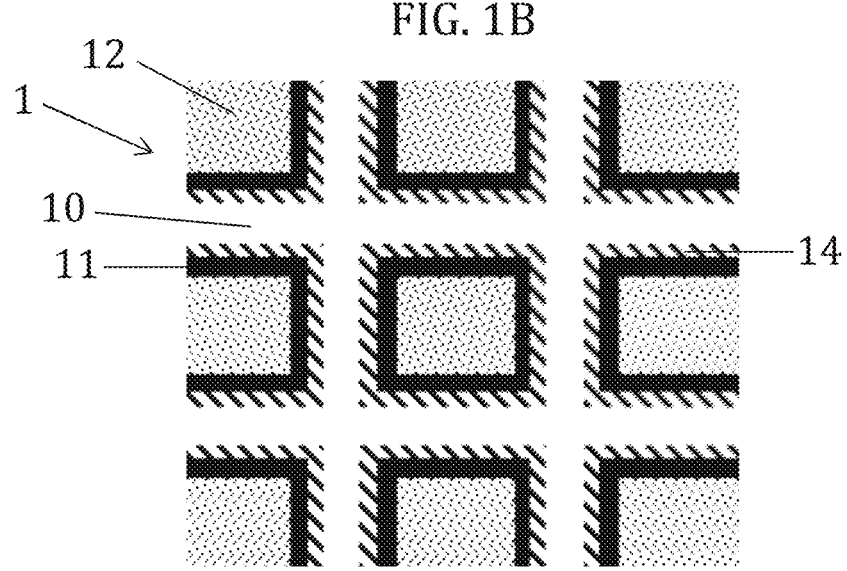
FIG. 1C schematically depicts a coated three-dimensional electronically conductive network, according to example embodiments.

Reference is now made to FIG. 1C, which shows the coated three-dimensional electronically conductive network 1 of FIG. 1B, but wherein metal 14, i.e. the metal ion of the electrolyte that permeated the coating 11 after reduction by the three-dimensional electronically conductive network 10, is plated between the coating 11 and the three-dimensional electronically conductive network 10. The coating 11 in this example is flexible, so that it does not break on plating of the metal 14.

Some embodiments of the present disclosure may provide a benefit in that the coating 11 allows uniform plating of the metal, such as lithium metal, in-between the coating 11 and the electronically conductive wire 10 comprised in the three-dimensional electronically conductive network 1, optionally on a seed layer. In absence of a coating, the metal would plate out preferentially on the top of the three-dimensional electronically conductive network with respect to the bottom of the three-dimensional electronically conductive network due to a potential drop over the three-dimensional electronically conductive network. For example, for a 35 μm thick three-dimensional electronically conductive network such as a nanomesh with 58% effective open porosity (i.e. taking into account a 10 nm coating), filled-up with an electrolyte with, for instance, a lithium ion conductivity of 1 mS/cm the areal resistance over the three-dimensional electronically conductive network is therefore (35 μm)/(1 mS/cm×0.58)=6 Ω·cm². In case of an applied plating current density of 10 mA/cm², this would lead to a potential drop over the 3D network of 6 Ω·cm²×10 mA/cm²=60 mV. The presence of the coating 11 permits a uniform plating. Without being bound by theory, it is believed to be achieved by having the potential drop over the coating 11 being the same or larger than the one over the three-dimensional electronically conductive network. The minimum ionic conductivity, $\sigma_{i,11}$, of the coating 11, can be estimated from the following equation:

$$\sigma_{i,11} = \frac{d_{11} \times (P/100\%)}{l_1 \times AE} \sigma_{12}$$

wherein $d_{11}$ is the thickness of the electronically insulating coating 11 in μm, P is the porosity in % of the coated three-dimensional electronically conductive network 1, $\sigma_{11}$ is the thickness in μm of the coated three-dimensional electronically conductive network 1, Av is the volumetric surface area in m²/cm³ of the coated three-dimensional electronically conductive network 1 and $\sigma_{12}$ is the ionic conductivity of the electrolyte 12.

We now estimate a conductivity of the coating 11 that, in some embodiments, may be used to reach a conformal plating of the metal 14. In this example, the coated three-dimensional electronically conductive network 1 may be a nanomesh with a mean pore size of 64 nm and have a thickness of 35 μm. The electrolyte 12 has, for instance, an ion conductivity of 1 mS/cm to a lithium ion. In this example, the coating 11 may have a thickness of 10 nm. The porosity of the three-dimensional electronically conductive network might be 58% after such a coating. In some embodiments, to achieve conformal plating of the metal 14, the conductivity of the coating 11 to the lithium ion is equal or lower than $2 \times 10^{-10}$ S/cm for an area enhancement of 1000. For instance, poly (p-phenylene oxide) (PPO), $Li_3PO_4$, $Li_2O$, and $Li_2CO_3$ may have such a low conductivity, and would thus be a particularly suitable material to be used for the coating 11 in this example. A coating 11 comprising PPO may be be made by electropolymerization, which is an upscalable and cost-effective technique. A further benefit of PPO is that the coating may be conformal as electropolymerization may be a self-limiting process. Furthermore, a coating 11 comprising PPO has viscoelastic properties and can withstand volume change.

In another example, the coated three-dimensional electronically conductive network 1 may be a copper foam with a mean pore size of 200 μm have a thickness of 100 μm. The electrolyte 12 has, for instance, an ion conductivity of 1 mS/cm to a lithium ion. In this example, the coating 11 may have a thickness of 100 nm. The porosity of the three-dimensional electronically conductive network might be 70% after such a coating. In some embodiments, to achieve conformal plating of the thin film metal 14, therefore, the conductivity of the coating 11 to the lithium ion is equal or lower than $0.7 \times 10^{-6}$ S/cm for an effective area enhancement of 1. For instance, LiPON may have such a low conductivity, and would thus be a particularly suitable material to be used for the coating 11 in this example.

In these examples, the metal 14 conformally and uniformly covers the three-dimensional electronically conductive network 10. In this way, the mechanical stress induced by the plated metal 14 to the coating 11 is minimized. Herein, uniform i.e. a uniformity in the thickness comprises that the three-dimensional electronically conductive network has a thickness extending from a first to a second surface of the network and wherein the mean thickness of the metal layer on the first surface is within 50%, for example within 20% of the thickness of the metal layer on the second surface. The thickness uniformity is determined by the resistance of the coating 11. The resistance of the coating is determined by the resistivity, $\sigma_{11}$, and the thickness. A lower conductivity will give better uniformity, however, may also require a larger plating overvoltage. Therefore, a trade-off between uniformity and overvoltage might be found by having a $\sigma_{11}$ between 10 times lower and 10 times higher than that determined by the equation above.

Furthermore, the thickness uniformity of the coating 11 can be deliberately made non-uniformity, with a slightly higher thickness (e.g +20% thicker than nominal value) at the top of the three-dimensional electronically conductive network 1 (i.e. at the interface with electrolyte) and slightly lower thickness (e.g. −20% thinner at the bottom (near current collector for closed network or the center for an open network as anode for cathodes on both sides, see battery schematics). A gradual change in thickness will provide a gradual change in resistance (higher on top, lower in the bottom) resulting in more thickness uniformity of the metal thin film.

Example 2: Plating of Lithium Between Nickel Foil and LiPON

Figure 2A:
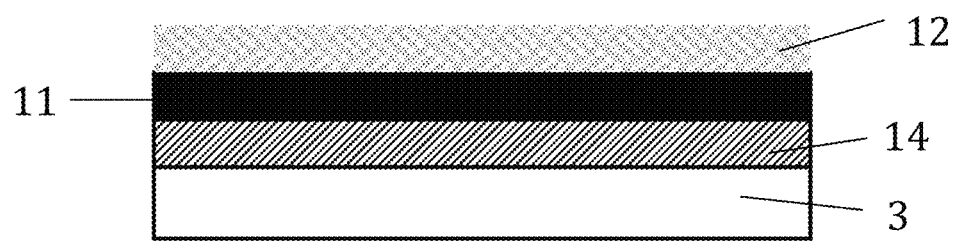
FIG. 2A is a schematic representation of a nickel foil, coated with an electrolyte coating, underneath which the Lithium is plated, according to example embodiments.

Reference is made to FIG. 2A. Nickel foil 3 is conformally covered by a coating 11 comprising LiPON, wherein the coating 11 has a thickness of 5 nm. The nickel foil 3 is used as a first electrode. An electrolyte 12 comprising 1M $LiClO_4$ i.e. comprising lithium ions covers the coating 11. The coating 11 is permeable and/or conductive to the lithium ions and has a low but non-zero conductivity toward them. The electrolyte 12 is contacted by a second electrode (not shown). On the application of a first potential, a conformal layer of lithium 14 is plated between the coating 11 and the nickel foil 3. The layer of lithium 14 formed in this way has a thickness of 100 nm.

Figure 2B:
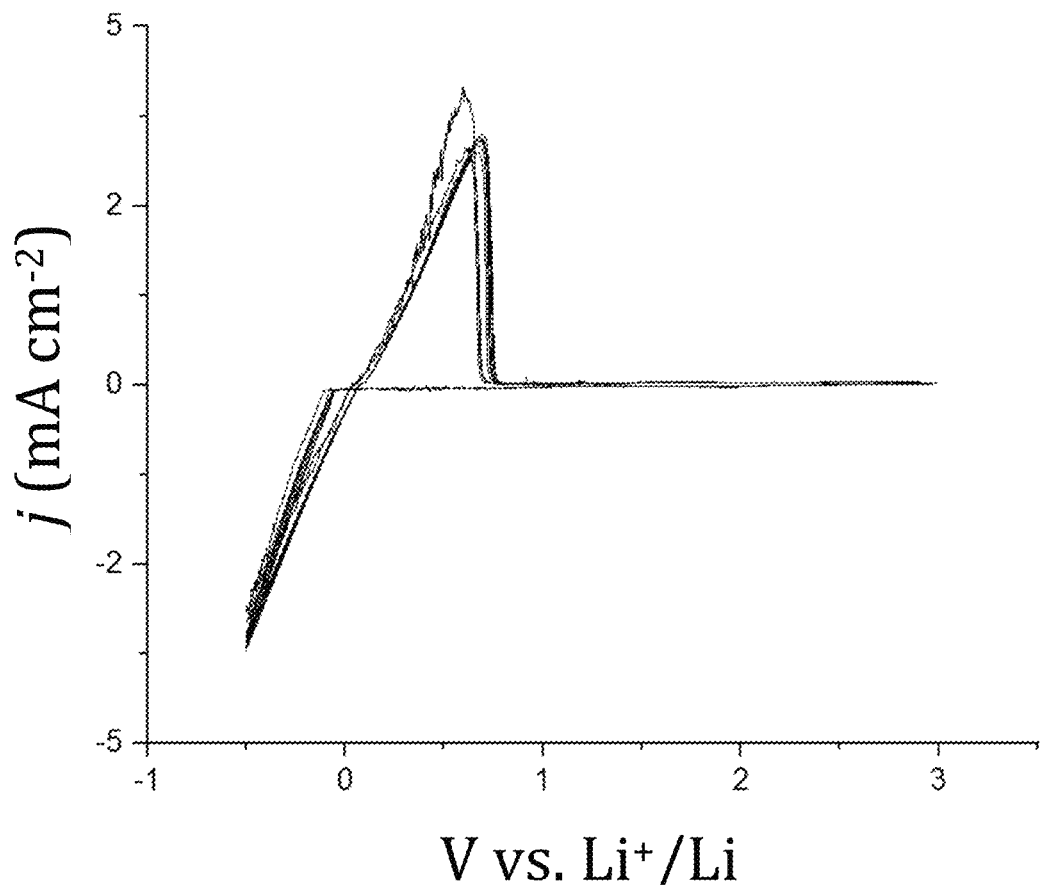
FIG. 2B shows a cyclic voltammogram obtained experimentally by cyclically plating lithium onto and stripping lithium from a nickel foil covered by an electrolyte coating.

Reference is made to FIG. 2B, which shows an example of a cyclic voltammogram measured on the structure of FIG. 2A, wherein the current density j (in mA cm$^{-2}$) is plotted as a function of applied potential V relative to the reduction potential of Li$^+$. The applied potential is tuned i.e. scanned at a scan rate of 25 mV/s.

First, the applied potential is reduced: at an applied potential below 0V, a negative current density may be observed in the voltammogram, corresponding to lithium ions being reduced and plated between the coating and the nickel foil. Next, on increasing the potential, the layer of lithium is stripped i.e. the lithium is oxidized, thereby forming lithium ions that may permeate the coating and move into the electrolyte. Oxidation is shown by an increase in current density. In this example, the current density reaches 3.5 mA cm$^{-2}$ at 0.75 V. In this example, above a potential of approximately 0.75V, the current density drops to zero, indicating that all lithium is stripped at that point. On further increasing the applied potential up to about 3V, therefore, the current remains zero. Cyclically, the applied potential is increased at a scan rate of 25 mV/s up to about 3V, then the applied potential is reduced at a scan rate of 25 mV/s down to about −0.5 V. It may be observed from FIG. 2B that, in the subsequent cycles, the current density is similar, indicating the high reproducibility of the plating and stripping, and the high stability of the coating.

In this example, nickel foil was used for which the current density reaches 3.5 mA cm$^{-2}$ i.e. at 0.75 V. In a further example, the nickel foil may be replaced by a coated three-dimensional electronically conductive network with identical lateral dimensions, and with a thickness of 35 μm and a volumetric surface area of 28 m$^2$/cm$^3$, i.e. according to embodiments of the present disclosure. The effective area of the coated three-dimensional electronically conductive network, comprising all surfaces of the coated three-dimensional electronically conductive network, is 1000 (i.e. 35 μm×28 m$^2$/cm$^3$) times as high as the surface area of the copper foil. Therefore, in some embodiments of the present disclosure, by using the coated three-dimensional electronically conductive network instead of the copper foil, an effective current density may be reached of approximately 3.5 A cm$^{-2}$.

Figure 3:
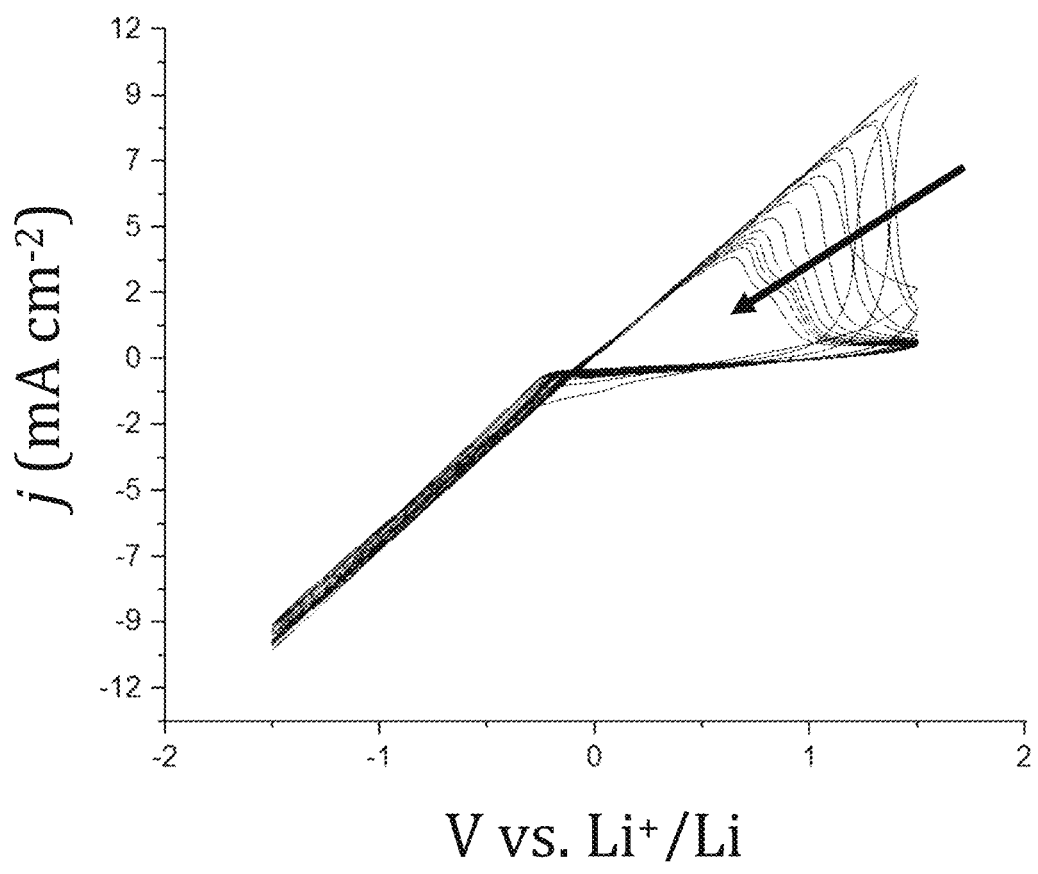
FIG. 3 shows cyclic voltammetric experimental results of cyclically plating and stripping lithium on surfaces of a nickel three-dimensional electronically conductive network according to an example embodiment.

Reference is now made to FIG. 3, which shows an example of cyclic voltammetry performed on a three-dimensional electronically conductive network comprising nickel, and which does not comprise a coating. The scan rate is 10 mV/s, and the electrolyte impregnating the three-dimensional electronically conductive network comprises 1M $LiClO_4$ in Propylene Carbonate (PC). In contrast to the cyclic voltammogram of FIG. 2B, in FIG. 3, the current density for the subsequent scan cycle is not reproducible, which is particularly clear for the positive potentials wherein the plated layer of lithium is stripped i.e. oxidized. From FIG. 3, it may be observed that on increasing the potential, in subsequent cycles, the charge density drops to zero at a lower potential in each cycle, as indicated by the arrow. Therefore, it seems that the amount of lithium that is stripped in subsequent scan cycles is reduced. This may indicate that the thickness of the plated layer of lithium is reduced in each cycle. It is, for instance, possible that a solid electrolyte interphase (SEI) is formed, wherein the SEI consumes lithium ions from the electrolyte, so that the concentration of lithium ions in the electrolyte is reduced, so that the thickness of the layer of lithium that is plated in each scan cycle is reduced. Such as SEI was not observed in the example of FIG. 2B, showing the importance of the coating for preventing the formation of the SEI.

Example 3: Assessing the Merits of Different Coatings

Figure 4A:
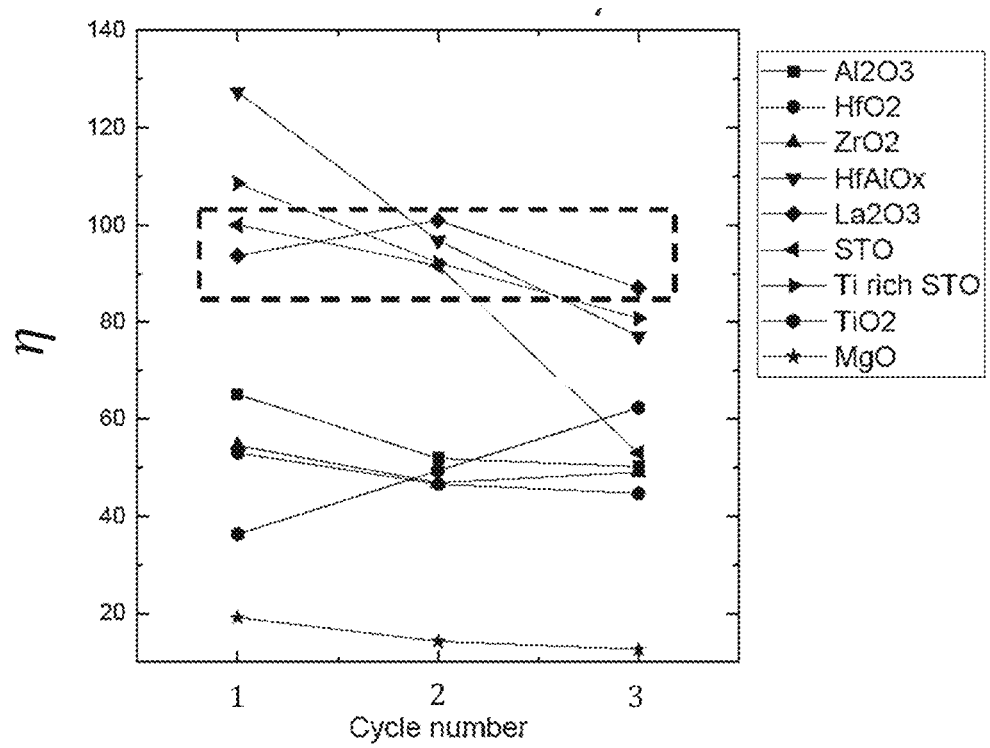
FIG. 4A shows the evolution over three cycles of the coulombic efficiency derived from cyclic voltammetry experiments involving plating lithium on and stripping lithium from titanium nitride coated with different thin-film coatings.

Electrochemical experiments such as cyclic voltammetry may be used to assess the merits of different coatings. The cyclic voltammetry experiment on a Titanium nitride substrate coated with different thin films oxides was reproduced to determine the merits of the different coatings. Reference is made to FIG. 4A. In order to compare the different coatings, a coulombic efficiency is determined from the cyclic voltammetry plot, which is the integrated charge density during stripping (wherein the potential >0V) as a percentage of the integrated charge during plating (wherein the potential <0V). The coulombic efficiency n for subsequent cycles i.e. cycle numbers is shown in FIG. 4A for subsequent cycles. The coulombic efficiency may be approximately 100% for each cycle, so that the amount of lithium stripped equals the amount if lithium plated.

Figure 4B:
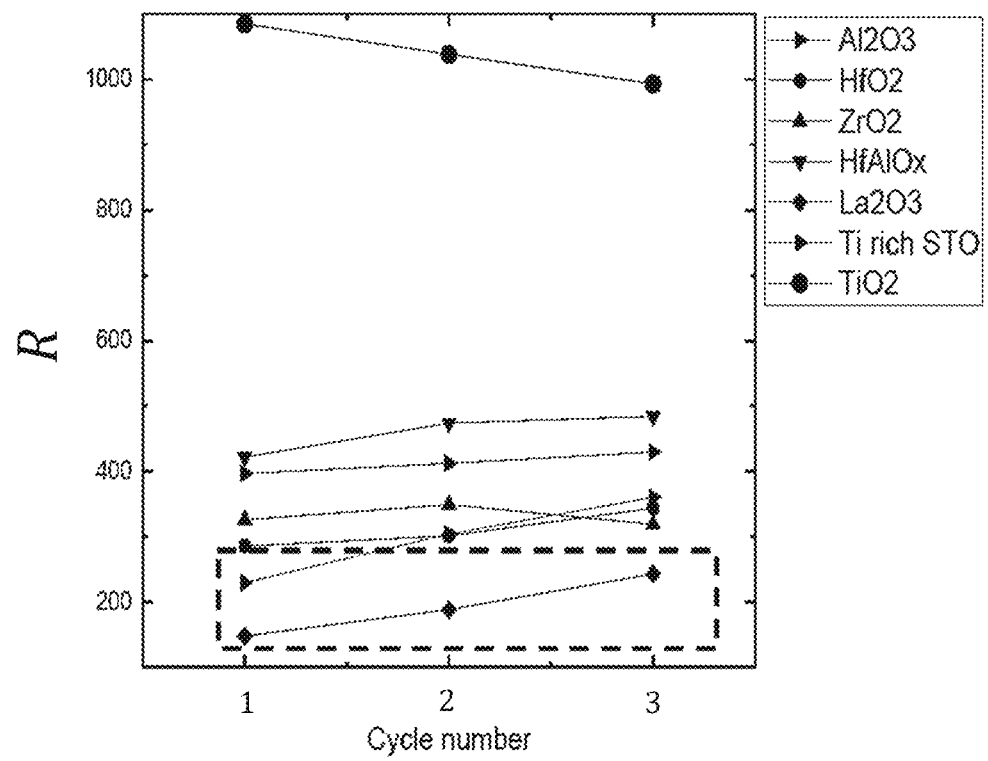
FIG. 4B shows the evolution over three cycles of the resistance derived from cyclic voltammetry experiments involving plating lithium on and stripping lithium from titanium nitride coated with different thin-film coatings.

Reference is made to FIG. 4B. Furthermore, a resistance R may be determined for each cycle number, corresponding to the inverse of the slope of the cyclic voltammogram for each coating from −0.5 V to 0.5 V. The resistance may be low e.g. 200Ω in this example, and constant for subsequent cycles.

These results are exemplary only, and only serve to show what type of experiment may be used to assess a suitable coating. A change in experimental setup may yield different results for the coatings, hence the results of FIG. 4A and FIG. 4B may not be extrapolated to different experiments and/or setups.

Figure 5A:
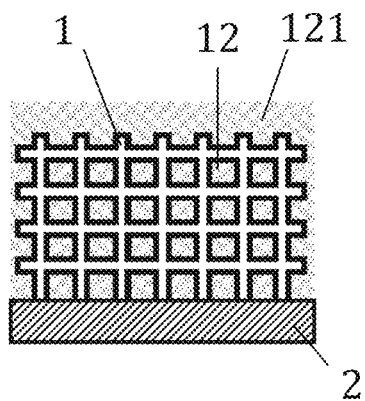
FIG. 5A schematically depicts a coated three-dimensional electronically conductive network impregnated with a solid composite electrolyte, according to example embodiments.
Figure 5B:
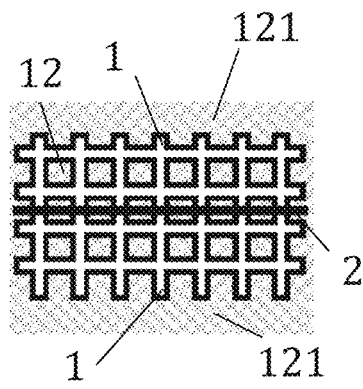
FIG. 5B schematically depicts a coated three-dimensional electronically conductive network impregnated with a solid composite electrolyte, according to example embodiments.
Figure 5C:
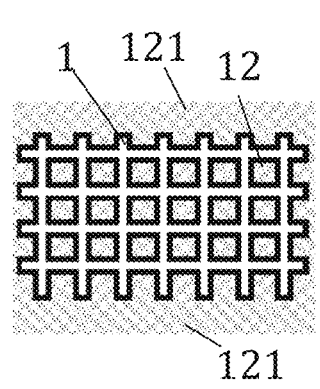
FIG. 5C schematically depicts a coated three-dimensional electronically conductive network impregnated with a solid composite electrolyte, according to example embodiments.

Example 4: Coated Three-Dimensional Electronically Conductive Network Impregnated with a Solid Composite Electrolyte Reference is made to FIG. 5A, FIG. 5B, and FIG. 5C. In these examples, the coated three-dimensional electronically conductive network 1 is impregnated with an electrolyte 12 that is a solid composite electrolyte. The solid composite electrolyte 12 fills pores of the coated three-dimensional electronically conductive network 1. In addition, the solid composite electrolyte 12 comprises an overfill region 121 that extends outside of the coated three-dimensional electronically conductive network 1. Otherwise said, the overfill region 121 of the solid composite electrolyte 12 is over the coated three-dimensional electronically conductive network 1. The overfill region 121 may act as a separator. For instance, in a battery comprising the coated three-dimensional electronically conductive network 1 acting as a cathode according to these examples, an anode may contact the overfill region 121. In that case, the coated three-dimensional electronically conductive network 1 does not contact the anode. However, ions may flow from the anode, through the overfill region 121, to the coated three-dimensional electronically conductive network 1. The overfill region 121 may be present on one side of the coated three-dimensional electronically conductive network 1, such as in FIG. 5A. In FIG. 5A, on the side of the coated three-dimensional electronically conductive network 1 opposite to the side touching the overfill region 121, the coated three-dimensional electronically conductive network 1 contacts a current collector 2. FIG. 5B shows an example of a current collector 2 that is on both sides in electrical contact with a coated three-dimensional electronically conductive network 1. In this example, both coated three-dimensional electronically conductive networks 1 are impregnated with a solid composite electrolyte 12. The solid electrolyte furthermore comprises an overfill region 121 covering both coated three-dimensional electronically conductive networks 1. FIG. 5C shows an example of a coated three-dimensional electronically conductive network 1 that is free-standing. The coated three-dimensional electronically conductive network 1 is impregnated with a solid composite electrolyte 12. The solid composite electrolyte 12 comprises two overfill regions 121 on opposite sides of the coated three-dimensional electronically conductive network 1.

Example 5: Battery Comprising a Coated Three-Dimensional Electronically Conductive Network Reference is made to FIG. 6A, wherein a metal-ion battery is shown comprising a coated three-dimensional electronically conductive network 1 according to embodiments of the present disclosure. A battery cell of the battery comprises a conductive substrate 5 and a composite cathode 6 on top of the conductive substrate. The composite cathode 6 in this example comprises electrode particles 61 that are bonded together by a binder 62 e.g. a polymer wrapped around the electrode particles 61. A conductive additive 63 is used to electronically contact the electrode particles 61 with each other. In this example, the composite cathode 6 and the coated three-dimensional electronically conductive network 1, which is the anode of the battery, are separated by each other by an electrolyte layer separator 4, e.g. a mechanical spacer, a fibreglass cloth or a flexible plastic film, or alternatively a solid electrolyte, thereby preventing short-circuit between the cathode and the anode. The coated three-dimensional electronically conductive network 1 is impregnated by an electrolyte 12, comprising a metal ion, such as aluminium, magnesium, sodium, or lithium. In some embodiments wherein the electrolyte separator 4 is a solid electrolyte, the separator comprises a second electrolyte that may be the same as or different from the electrolyte 12. The electrolyte separator 4 comprises the metal ion. The electrolyte separator 4 is at least permeable to the metal ion. The composite cathode 6 is impregnated by a third electrolyte 64 comprising the metal ion. The third electrolyte 64 may be the same as or different from the second electrolyte. The third electrolyte 64 may be the same as or different from the electrolyte 12.

The battery of this example comprises multiple battery cells. The battery cell shares the conductive substrate 5 with a first adjacent battery cell. Moreover, the battery shares the coated three-dimensional electronically conductive network 1 with a second adjacent battery cell. In this configuration, multiple battery cells may be stacked on each other, thereby making a battery with a very high capacity and power, wherein coated three-dimensional electronically conductive networks 1 and conductive substrates 5 are shared between adjacent battery cells, thereby reducing the amount of material compared to a configuration wherein the coated three-dimensional electronically conductive network 1 and the conductive substrate 5 are not shared with adjacent battery cells.

Figure 6A:
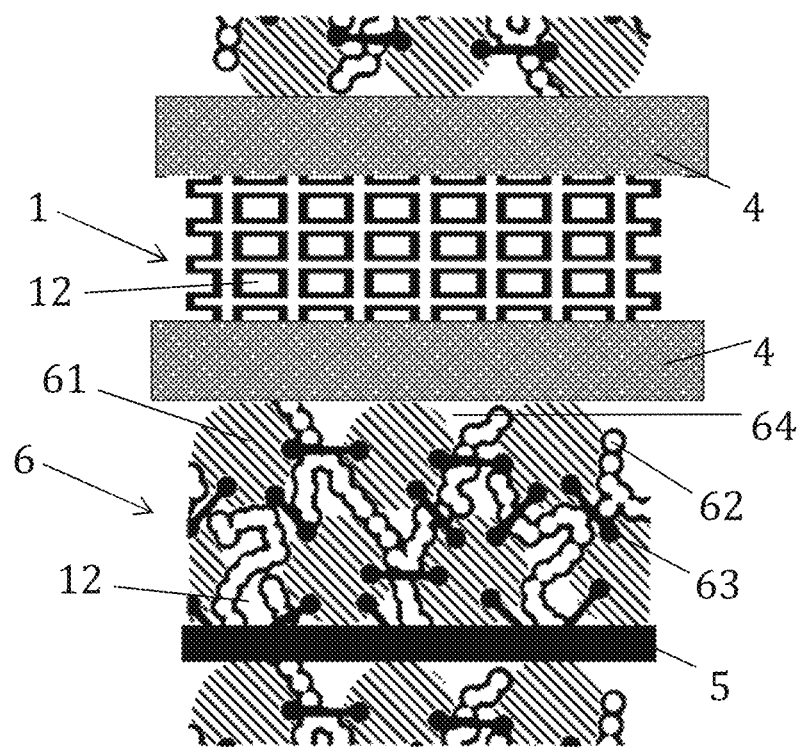
FIG. 6A is a schematic depiction of batteries, according to an example embodiment.
Figure 6B:
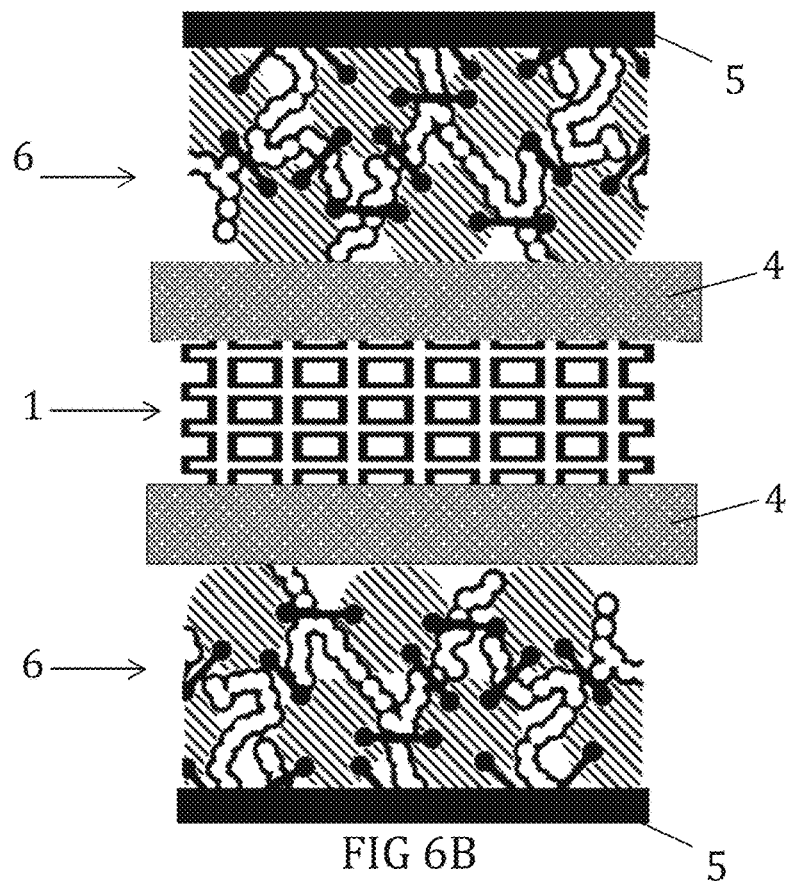
FIG. 6B is a schematic depiction of batteries, according to an example embodiment.

Reference is made to FIG. 6B. A battery according to embodiments of the present disclosure, similar as that of FIG. 6A, is shown, comprising, in this example, two battery cells, wherein the coated three-dimensional electronically conductive network 1 is shared by the two battery cells. The battery of this example comprises a conductive substrate 5, with on top of the conductive substrate a composite cathode 6. On top of the composite cathode 6, the battery comprises an electrolyte separator 4, on top of which the battery comprises the coated three-dimensional electronically conductive network 1. In turn, on top of the coated three-dimensional electronically conductive network 1 there is another electrolyte separator 4, on top of which there is another composite cathode 6. The another composite cathode 6 in turn is contacted and covered by a further conductive substrate 5.

Figure 6C:
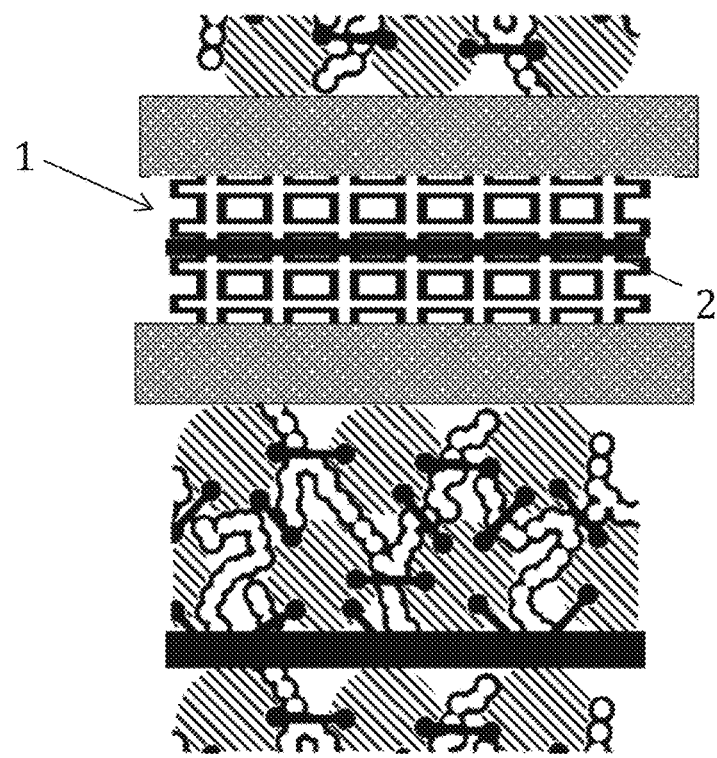
FIG. 6C and FIG. 6D are schematic depictions of batteries, according to an example embodiment.

Reference is made to FIG. 6C. As another example, instead of using a coated three-dimensional electronically conductive network that is free-standing and opened on both sides (i.e. without current collector), as in FIG. 6A the coated three-dimensional electronically conductive network 1 may be contacted with a current collector, as in FIG. 6C. Free-standing refers to the fact that the coated three-dimensional electronically conductive network 1 is not supported by a conductive substrate. Alternatively, a current collector 2 may be used so that the coated three-dimensional electronically conductive network 1 is not free-standing. In some embodiments, the use of the current collector 2 improves the stability of the coated three-dimensional electronically conductive network, possible however at the possible cost of requiring more material and being heavier and thicker. In this configuration, the current collector 2 may be shared between adjacent battery cells, instead of the coated three-dimensional electronically conductive network 1 as in the example of FIG. 6A.

Figure 6D:
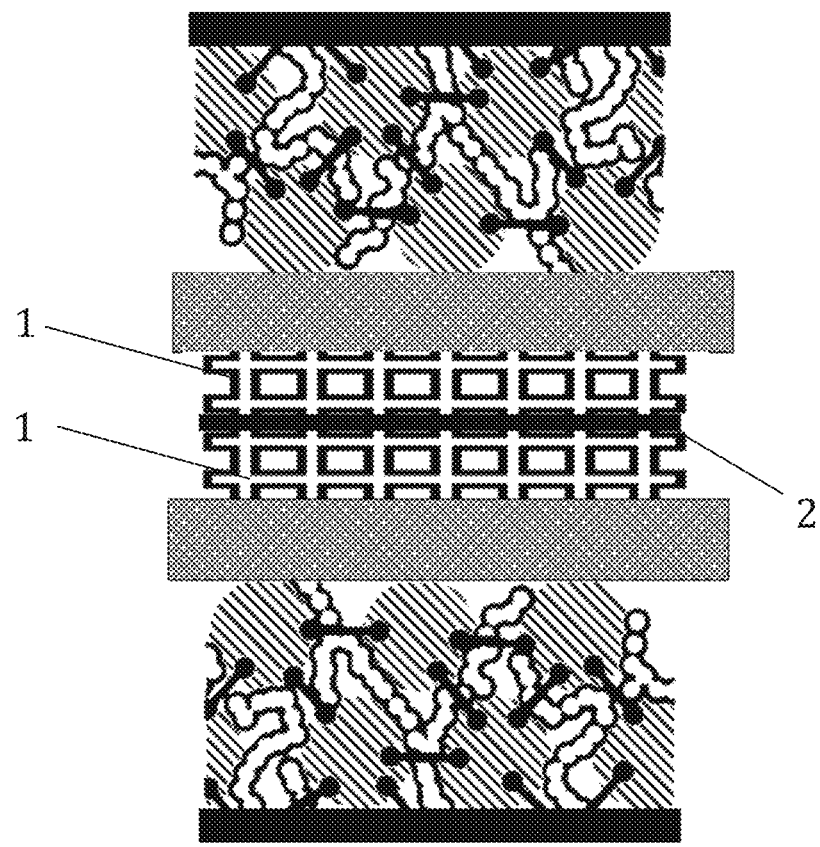

Reference is made to FIG. 6D. As another example, a battery comprising two battery cells, such as described in FIG. 6B, may also comprise the collector 2, that is used so that the coated three-dimensional electronically conductive network 1 is not free-standing. However, the present disclosure is not limited to these examples, and also different configurations for the battery may be envisaged.

Figure 7:
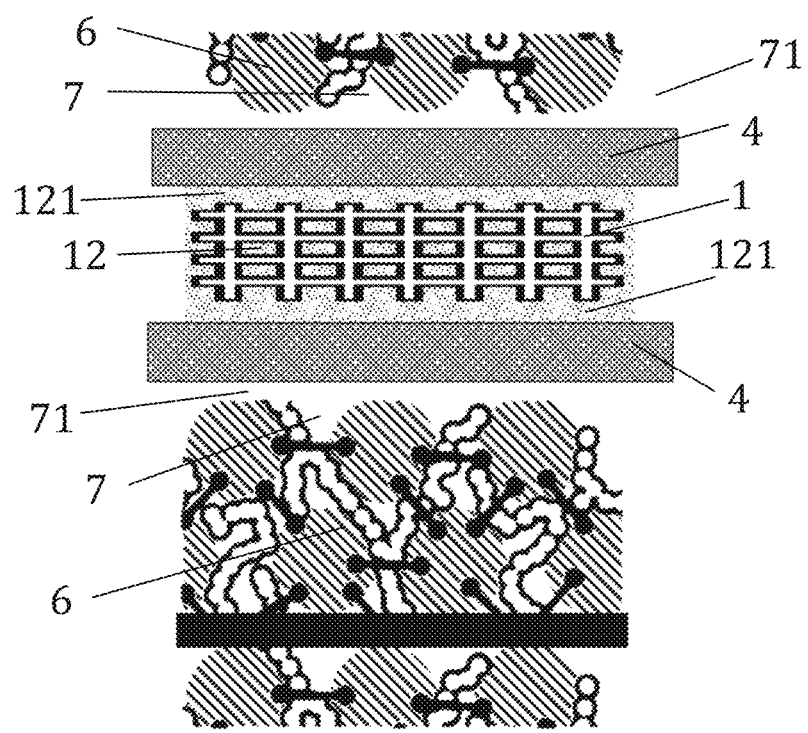
FIG. 7 is a schematic representation of a battery comprising a coated three-dimensional electronically conductive network impregnated with a solid composite electrolyte, wherein the battery comprises a separator, according to example embodiments.
Figure 8:
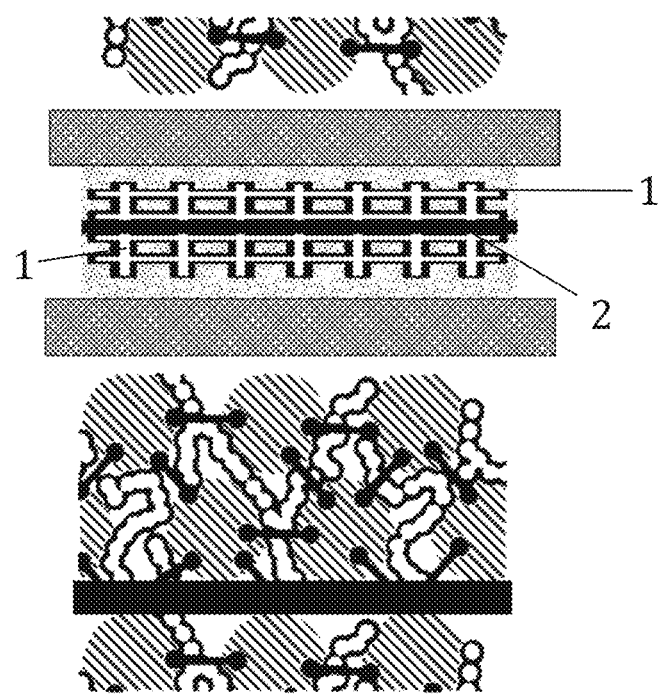
FIG. 8 is a schematic representation of a battery comprising a coated three-dimensional electronically conductive network impregnated with a solid composite electrolyte and contacting a conductive substrate, wherein the battery comprises a separator, according to example embodiments.

Example 6: Battery Comprising a Coated Three-Dimensional Electronically Conductive Network Impregnated with a Solid Composite Electrolyte Reference is made to FIG. 7, wherein a metal-ion battery is shown comprising a coated three-dimensional electronically conductive network 1 as an anode according to embodiments of the present disclosure. An electrolyte 12 that is a solid composite electrolyte impregnates the coated three-dimensional electronically conductive network 1. The solid composite electrolyte 12 further comprises two overfill regions 121 on opposite sides of the coated three-dimensional electronically conductive network 1. A second electrolyte 7 that is also a solid composite electrolyte impregnates a composite cathode 6 of the battery. The electrolyte 12 and the second electrolyte 7 may or may not comprise a different type of solid composite electrolyte. Also the second electrolyte 7 comprises an overfill region 71. In this example, the battery is stacked, so that there is a composite cathode 7 on both sides of the coated three-dimensional electronically conductive network 1 i.e. the anode. Between the overfill region 71 of the solid composite electrolyte 7 that impregnates each of the composite cathodes 6 and the overfill region 121 of the solid composite electrolyte 12 that impregnates the coated three-dimensional electronically conductive network 1, there is an electrolyte separator 4 that is a solid composite electrolyte separator. In this example, the coated three-dimensional electronically conductive network 1 is free-standing. However, a similar configuration is possible for an anode comprising a conductive substrate 2 that is on both sides contacted with a coated three-dimensional electronically conductive network 1, as is shown in FIG. 8.

Figure 9:
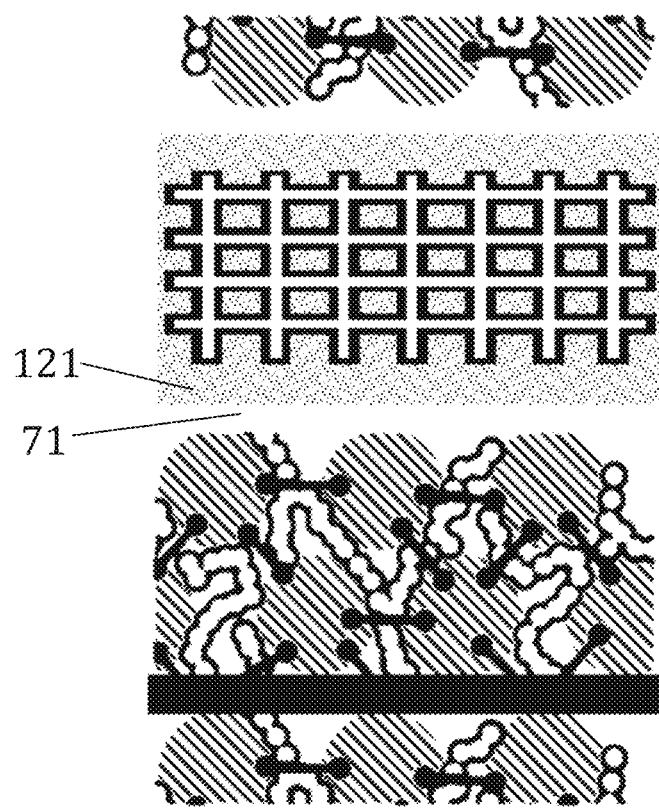
FIG. 9 is a schematic representation of a battery comprising a coated three-dimensional electronically conductive network impregnated with a solid composite electrolyte, according to example embodiments.
Figure 10:
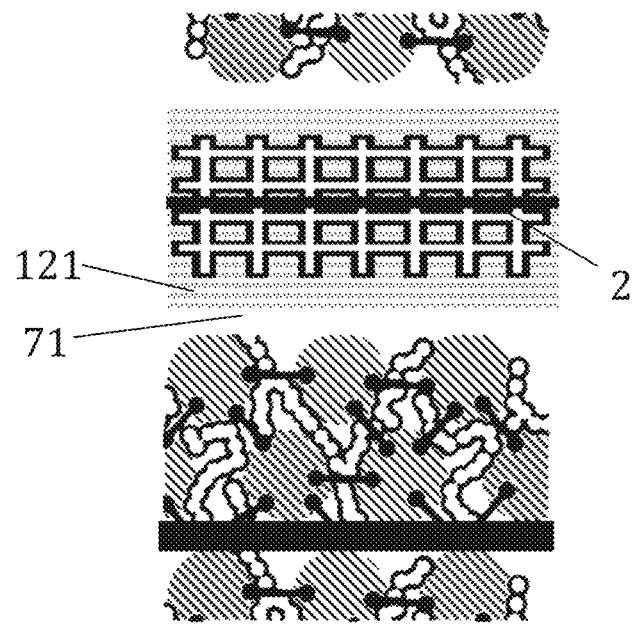
FIG. 10 is a schematic representation of a battery comprising a coated three-dimensional electronically conductive network impregnated with a solid composite electrolyte and contacting a conductive substrate, according to example embodiments.

Reference is made to FIG. 9. The overfill regions 71 and 121 are an electrolyte layer acting as a separator, so that no separate separator element is required. In this example, the overfill region 71 of the solid composite electrolyte 7 that impregnates each of the composite cathodes 6 and the overfill region 121 of the solid composite electrolyte 12 that impregnates the coated three-dimensional electronically conductive network 1 are in physical contact with each other. The battery may thereby be assembled without including a separate separator element. This may facilitate manufacturing, and may reduce a material cost of the battery. Reference is made to FIG. 10, where a similar configuration is shown as in FIG. 9. In FIG. 9, the coated three-dimensional electronically conductive network 1 is free-standing, whereas in FIG. 10, the coated three-dimensional electronically conductive network contacts a conductive substrate 2.

Figure 11:
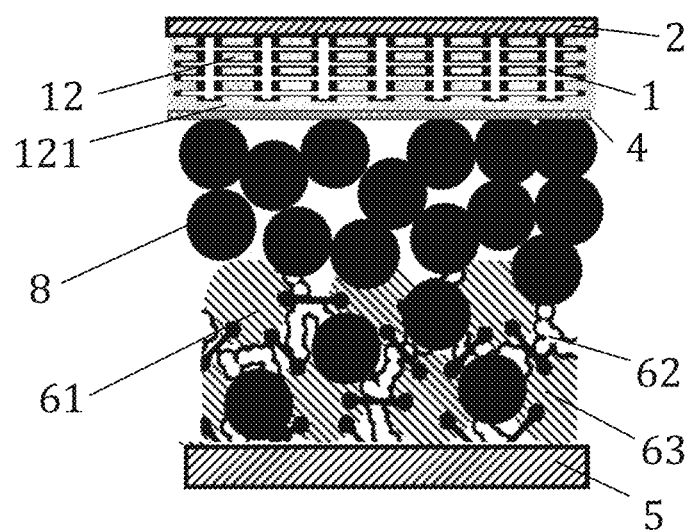
FIG. 11 is a schematic representation of a battery comprising a coated three-dimensional electronically conductive network as an anode, and a solid-state ceramic cathode, according to example embodiments.

Example 7: Battery Comprising a Coated Three-Dimensional Electronically Conductive Network and a Solid-State Ceramic Cathode Reference is made to FIG. 11, which is a solid-state metal battery. In this example, the anode comprises a coated three-dimensional electronically conductive network 1. The coated three-dimensional electronically conductive network 1 of this example contacts a conductive substrate 2, but this is not essential and instead the coated three-dimensional electronically conductive network 1 could be free-standing. The coated three-dimensional electronically conductive network 1 is impregnated with a solid composite electrolyte 12. In this example, the solid composite electrolyte 12 comprises an overfill region 121. In this example the cathode is a solid-state ceramic cathode comprising an active cathode material 61 in electrical contact with a current collector 5, possibly a binding polymer 62, and a conductive additive 63. The cathode further comprises an inorganic solid electrolyte 8 comprising an oxide or a sulphide. In this example, the overfill region 121 and the inorganic solid electrolyte 8 are separated by an electrolyte separator 4. This is, however, not required, as the overfill region 121 may instead act as a separator.

A number of examples have been provided above of particular battery types comprising a coated three-dimensional electronically conductive network according to embodiments of the present disclosure. The person skilled in the art will appreciate that the coated three-dimensional electronically conductive network according may also be comprised in different types of batteries without falling outside of the scope of the present disclosure. For instance, similarly, in metal-sulphur batteries, or in metal-air batteries, an anode may comprise the coated three-dimensional electronically conductive network. Furthermore, also in metal-sulphur batteries, or in metal-air batteries, the coated three-dimensional electronically conductive network may be impregnated with a liquid electrolyte or a solid composite electrolyte, although the present disclosure is not limited thereto. Furthermore, also in metal-sulphur batteries, or in metal-air batteries, the solid composite electrolyte may comprise an overfill region, that may for instance act as a separator layer.

Although specific configurations for batteries are shown in these examples, many other configurations comprising the coated three-dimensional electronically conductive network are possible, and the present disclosure is not limited to this example.

It is to be understood that although preferred specific embodiments, specific constructions and configurations, as well as materials, have been discussed herein for devices according to the present disclosure, various changes or modifications in form and detail may be made without departing from the scope and spirit thereof. For example, any formulas given above are merely representative of procedures that may be used. Steps may be added or deleted to methods described within the scope of the present disclosure.

The invention claimed is:

1. A coated three-dimensional electronically conductive network for acting as an electrode in a metal or metal-ion battery, wherein the metal is selected from the list consisting of Na, K, Li, Ca, Mg, and Al, and wherein the network comprises:
a three-dimensional electronically conductive network comprising a plurality of interconnected electronically conductive wires, wherein the three-dimensional electronically conductive network has a porosity of at least 60% and a volumetric surface area between $10^{-3}$ m$^2$/cm$^3$ and 100 m$^2$/cm$^3$, and an electronically insulating coating that conformally covers all surfaces of the network and is at least one of permeable or conductive to ions of the metal at at least one temperature in the range of from −30° C. to 150° C.

2. The coated three-dimensional electronically conductive network of claim 1, wherein the electronically insulating coating has a mean thickness between 2 and 500 nm.

3. The coated three-dimensional electronically conductive network of claim 1, wherein the metal is Li and wherein the electronically insulating coating is at least one of permeable or conductive to Li$^+$ at at least one temperature in the range of from −30° C. to 150° C.

4. The coated three-dimensional electronically conductive network of claim 1, wherein the electronically insulating coating is unreactive toward the metal at least at from −30° C. to 180° C.

5. The coated three-dimensional electronically conductive network of claim 1, wherein the coated three-dimensional electronically conductive network is impregnated with an electrolyte that comprises an ion of the metal and wherein a conductivity of the electronically insulating coating to the metal ion is larger than 0.1 $\sigma_{i,11}$, wherein $\sigma_{i,11}$ is given by the following formula:

$$\sigma_{i,11} = \frac{d_{11} \times (P/100\%)}{l_1^2 \times Av} \sigma_{12},$$

wherein $d_{11}$ is the thickness of the electronically insulating coating in μm, P is the porosity in % of the coated three-dimensional electronically conductive network, $l_1$ is the thickness in μm of the coated three-dimensional electronically conductive network, Av is the volumetric surface area in m$^2$/cm$^3$ of the coated three-dimensional electronically conductive network, and $\sigma_{12}$ is the ionic conductivity of the electrolyte.

6. The coated three-dimensional electronically conductive network of claim 5, wherein the conductivity of the electronically insulating coating to the metal ion is larger than 1 $\sigma_{i,11}$.

7. The coated three-dimensional electronically conductive network of claim 1, wherein the coating comprises one of the following materials: a solid electrolyte, an oxide, a polymer, a hybrid-inorganic organic material, a metal organic framework (MOF), or a covalent organic framework (COF).

8. The coated three-dimensional electronically conductive network of claim 1, further comprising a seed layer between the coating and the three-dimensional electronically conductive network, the seed layer being such as to promote at least one of the growth of a layer of the metal, a compound of the metal, or an alloy of the metal, the seed layer conformally covering all surfaces of the network.

9. The coated three-dimensional electronically conductive network of claim 8, wherein the seed layer has a thickness between 2 and 100 nm.

10. The coated three-dimensional electronically conductive network of claim 1, wherein the three-dimensional electronically conductive network has a volumetric surface area between 10 m$^2$/cm$^3$ and 50 m$^2$/cm$^3$.

11. The coated three-dimensional electronically conductive network of claim 1, further comprising a conformal layer of the metal between the electronically insulating coating and the three-dimensional electronically conductive network.

12. The coated and plated three-dimensional electronically conductive network of claim 11, wherein the conformal layer of the metal is uniform and is plated between the electronically insulating coating and the three-dimensional electronically conductive network.

13. A method for forming a coated three-dimensional electronically conductive network, comprising:
obtaining a three-dimensional electronically conductive network comprising a plurality of interconnected electronically conductive wires, wherein the three-dimensional electronically conductive network has a porosity of at least 60% and a volumetric surface area between $10^{-3}$ m$^2$/cm$^3$ and 100 m$^2$/cm$^3$, and
coating all surfaces of the three-dimensional electronically conductive network conformally with an electronically insulating coating, wherein the coating is at least one of permeable or conductive to ions of the metal at at least one temperature in the range of from −30° C. to 150° C.

14. The method of claim 13, further comprising plating a metal between the coated three-dimensional electronically conductive network and the coating of the coated three-dimensional electronically conductive network by:
impregnating the coated three-dimensional electronically conductive network with an electrolyte comprising an ion of the metal, and
applying a first potential for plating the metal to the three-dimensional electronically conductive network.

15. The method of claim 14, further comprising cyclically applying a second potential for stripping the metal and the first potential.

16. A metal-ion battery comprising:
a conductive substrate,
a cathode on top of the conductive substrate,
an electrolyte layer on top of the cathode, and
a coated three-dimensional electronically conductive network comprising:
a three-dimensional electronically conductive network that comprises a plurality of interconnected electronically conductive wires, wherein the three-dimensional electronically conductive network has a porosity of at least 60% and a volumetric surface area between $10^{-3}$ m²/cm³ and 100 m²/cm³, and an electronically insulating coating that conformally covers all surfaces of the network and is at least one of permeable or conductive to ions of the metal of the metal-ion battery at at least one temperature in the range of from −30° C. to 150° C., wherein the coated three-dimensional electronically conductive network is impregnated with an electrolyte and acts as an anode on top of the electrolyte layer.

17. The metal-ion battery of claim 16, wherein the coated three-dimensional electronically conductive network further comprises a conformal layer of the metal between the electronically insulating coating and the three-dimensional electronically conductive network.

18. The battery of claim 16, wherein the electronically insulating coating has a mean thickness between 2 and 500 nm.

19. The battery of claim 16, wherein the metal is Li and wherein the electronically insulating coating is at least one of permeable or conductive to Li⁺ at at least one temperature in the range of from −30° C. to 150° C.

20. The battery of claim 16, wherein the coated three-dimensional electronically conductive network is impregnated with an electrolyte that comprises an ion of the metal and wherein a conductivity of the electronically insulating coating to the metal ion is larger than 0.1 $\sigma_{i,11}$, wherein $\sigma_{i,11}$ is given by the following formula:

$$\sigma_{i,11} = \frac{d_{11} \times (P/100\%)}{l_1^2 \times Av} \sigma_{12},$$

wherein $d_{11}$ is the thickness of the electronically insulating coating in μm, P is the porosity in % of the coated three-dimensional electronically conductive network, $l_1$ is the thickness in μm of the coated three-dimensional electronically conductive network, Av is the volumetric surface area in m²/cm³ of the coated three-dimensional electronically conductive network, and $\sigma_{12}$ is the ionic conductivity of the electrolyte.

* * * * *